US012670848B2

(12) United States Patent
Kim et al.

(10) Patent No.: US 12,670,848 B2
(45) Date of Patent: Jun. 30, 2026

(54) PIXEL DRIVEN BY PULSE WIDTH MODULATION AND DISPLAY DEVICE INCLUDING THE SAME

(71) Applicant: Samsung Display Co., LTD., Yongin-si (KR)

(72) Inventors: Dongwoo Kim, Yongin-si (KR); Kwihyun Kim, Yongin-si (KR); Junghwan Hwang, Yongin-si (KR); Sehyun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/011,042

(22) Filed: Jan. 6, 2025

(65) Prior Publication Data

US 2025/0308439 A1 Oct. 2, 2025

(30) Foreign Application Priority Data

Apr. 1, 2024 (KR) ........................ 10-2024-0043934

(51) Int. Cl.
*G09G 3/32* (2016.01)

(52) U.S. Cl.
CPC ....... *G09G 3/32* (2013.01); *G09G 2300/0819* (2013.01); *G09G 2320/064* (2013.01); *G09G 2330/021* (2013.01)

(58) Field of Classification Search
CPC ............. G09G 3/32; G09G 2300/0819; G09G 2320/064; G09G 2330/021
See application file for complete search history.

(56) References Cited

U.S. PATENT DOCUMENTS

2023/0101460 A1* 3/2023 Kim .......................... G09G 3/32 345/204
2024/0321181 A1* 9/2024 Lin .......................... G09G 3/32
2025/0037660 A1* 1/2025 Liao ..................... G09G 3/3233
2025/0111817 A1* 4/2025 Lin ...................... G09G 3/2018

FOREIGN PATENT DOCUMENTS

KR 10-2022-0052265 4/2022

OTHER PUBLICATIONS

Richter et al., "OLED-on-CMOS Based Bidirectional Microdisplay for Near-to-Eye and Sensor Applications", pp. 1-3 (Total 3 pages).

* cited by examiner

*Primary Examiner* — Kwang-Su Yang
(74) *Attorney, Agent, or Firm* — CANTOR COLBURN LLP

(57) ABSTRACT

A pixel includes a light-emitting element including a first electrode and a second electrode connected to a low power line which transmits a low power voltage, a pulse width modulator which controls an emission time duration of the light-emitting element based on a data voltage and a sweep signal, and a constant current generator which supplies a driving current having a constant level to the light-emitting element based on a constant current generation voltage. The sweep signal has a first high voltage level in a non-emission period, and is boosted to a second high voltage level, which is higher than the first high voltage level, before decreasing to a low voltage level lower than the first high voltage level in an emission period.

18 Claims, 19 Drawing Sheets

PIXEL DRIVEN BY PULSE WIDTH MODULATION AND DISPLAY DEVICE INCLUDING THE SAME

CROSS-REFERENCE TO RELATED APPLICATION(S)

This application claims priority to Korean Patent Application No. 10-2024-0043934 under 35 U.S.C. § 119, filed in the Korean Intellectual Property Office (KIPO) on Apr. 1, 2024, the entire disclosure of which is incorporated herein by reference.

BACKGROUND

1. Technical Field

Embodiments relate to a display device. More specifically, embodiments relate to a pixel driven by a pulse width modulation and a display device that includes the pixel.

2. Description of the Related Art

A display device may include a plurality of pixels, each containing a self-luminous element. The self-luminous element may include an organic light-emitting diode, a quantum dot light-emitting diode, a micro light-emitting diode, etc.

Generally, an organic light-emitting diode may be driven by a pulse amplitude modulation that controls a brightness of the light emitted from the pixel by adjusting an amplitude of the driving current flowing through the organic light-emitting diode.

In the case where a micro light-emitting diode is driven by the pulse amplitude modulation, a wavelength of the light emitted from the micro light-emitting diode may shift due to variations in the amplitude of the driving current flowing through the micro light-emitting diode. To address this, the micro light-emitting diode may be driven by a pulse width modulation that controls the brightness of the light emitted from the pixel by adjusting an emission time of the micro light-emitting diode while maintaining the amplitude of the driving current flowing through the micro light-emitting diode constant.

SUMMARY

Embodiments provide a pixel with low power consumption and a display device including the pixel.

A pixel according to embodiments may include a light-emitting element including a first electrode and a second electrode connected to a low power line which transmits a low power voltage, a pulse width modulator which controls an emission time duration of the light-emitting element based on a data voltage and a sweep signal, and a constant current generator which supplies a driving current having a constant level to the light-emitting element based on a constant current generation voltage. The sweep signal may have a first high voltage level in a non-emission period and may be boosted to a second high voltage level, which is higher than the first high voltage level, before decreasing to a low voltage level lower than the first high voltage level in an emission period.

In an embodiment, the sweep signal may maintain the second high voltage level for a selected time period before decreasing to the low voltage level in the emission period.

In an embodiment, the sweep signal may linearly decrease from the second high voltage level to the low voltage level in the emission period.

In an embodiment, the pulse width modulator may include a first driving transistor including a gate electrode connected to a first node, a first electrode connected to a second node, and a second electrode connected to a third node; a first write transistor including a gate electrode which receives a scan signal, a first electrode connected to a data line which transmits the data voltage, and a second electrode connected to the second node; a first compensation transistor including a gate electrode which receives the scan signal, a first electrode connected to the third node, and a second electrode connected to the first node; a first emission control transistor including a gate electrode which receives an emission control signal, a first electrode which receives a first high power voltage, and a second electrode connected to the second node; a second emission control transistor including a gate electrode which receives the emission control signal, a first electrode connected to the third node, and a second electrode connected to a fourth node; a first initialization transistor including a gate electrode which receives a first initialization gate signal, a first electrode which receives a first initialization voltage, and a second electrode connected to the first node; and a first capacitor including a first electrode which receives the sweep signal and a second electrode connected to the first node.

In an embodiment, the first driving transistor may be a P-type transistor, and each of the first write transistor and the first compensation transistor may be an N-type transistor.

In an embodiment, the constant current generator may include a second driving transistor including a gate electrode connected to the fourth node, a first electrode connected to a fifth node, and a second electrode connected to a sixth node; a second write transistor including a gate electrode which receives a constant current generation scan signal, a first electrode connected to the data line which transmits the constant current generation voltage, and a second electrode connected to the fifth node; a second compensation transistor including a gate electrode which receives the constant current generation scan signal, a first electrode connected to the sixth node, and a second electrode connected to the fourth node; a third emission control transistor including a gate electrode which receives the emission control signal, a first electrode which receives a second high power voltage, and a second electrode connected to the fifth node; a fourth emission control transistor including a gate electrode which receives the emission control signal, a first electrode connected to the sixth node, and a second electrode connected to the first electrode of the light-emitting element; a second initialization transistor including a gate electrode which receives a second initialization gate signal, a first electrode which receives the first initialization voltage, and a second electrode connected to the fourth node; a bypass transistor including a gate electrode which receives a bypass gate signal, a first electrode connected to a second initialization voltage line which transmits a second initialization voltage, and a second electrode connected to the first electrode of the light-emitting element; and a second capacitor including a first electrode which receives the second high power voltage and a second electrode connected to the fourth node.

In an embodiment, the second driving transistor may be a P-type transistor, and each of the second write transistor and the second compensation transistor may be an N-type transistor.

In an embodiment, the second initialization voltage line may be separate or electrically disconnected from the low power line.

In an embodiment, a frame may include a display scan period in which the data voltage is written and a self-scan period in which the data voltage is not written. The second initialization gate signal may have a turn-on voltage level in a first initialization period of the display scan period and a second initialization period of the self-scan period.

In an embodiment, the first initialization gate signal may have a turn-on voltage level in the first initialization period, and may have a turn-off voltage level in the second initialization period.

A pixel of a display device driven in a normal mode and a high brightness mode according to embodiments may include a light-emitting element including a first electrode and a second electrode connected to a low power line which transmits a low power voltage; a pulse width modulator which controls an emission time duration of the light-emitting element based on a data voltage and a sweep signal; and a constant current generator which provides a driving current having a constant level to the light-emitting element based on a constant current generation voltage. The sweep signal may decrease from a first high voltage level to a first low voltage level lower than the first high voltage level in an emission period of the normal mode. The sweep signal may be boosted to a second high voltage level higher than the first high voltage level before decreasing to a second low voltage level in an emission period of the high brightness mode.

In an embodiment, the sweep signal may maintain the second high voltage level for a selected time period before decreasing to the second low voltage level in the emission period of the high brightness mode.

In an embodiment, the second low voltage level may be higher than the first low voltage level.

In an embodiment, a maximum voltage level of the data voltage in the high brightness mode may be equal to a maximum voltage level of the data voltage in the normal mode.

In an embodiment, the pulse width modulator may include a first driving transistor including a gate electrode connected to a first node, a first electrode connected to a second node, and a second electrode connected to a third node; a first write transistor including a gate electrode which receives a scan signal, a first electrode connected to a data line which transmits the data voltage, and a second electrode connected to the second node; a first compensation transistor including a gate electrode which receives the scan signal, a first electrode connected to the third node, and a second electrode connected to the first node; a first emission control transistor including a gate electrode which receives an emission control signal, a first electrode which receives a first high power voltage, and a second electrode connected to the second node; a second emission control transistor including a gate electrode which receives the emission control signal, a first electrode connected to the third node, and a second electrode connected to a fourth node; a first initialization transistor including a gate electrode which receives a first initialization gate signal, a first electrode which receives a first initialization voltage, and a second electrode connected to the first node; and a first capacitor including a first electrode which receives the sweep signal and a second electrode connected to the first node.

In an embodiment, the constant current generator may include a second driving transistor including a gate electrode connected to the fourth node, a first electrode connected to a fifth node, and a second electrode connected to a sixth node; a second write transistor including a gate electrode which receives a constant current generation scan signal, a first electrode connected to the data line which transmits the constant current generation voltage, and a second electrode connected to the fifth node; a second compensation transistor including a gate electrode which receives the constant current generation scan signal, a first electrode connected to the sixth node, and a second electrode connected to the fourth node; a third emission control transistor including a gate electrode which receives the emission control signal, a first electrode which receives a second high power voltage, and a second electrode connected to the fifth node; a fourth emission control transistor including a gate electrode which receives the emission control signal, a first electrode connected to the sixth node, and a second electrode connected to the first electrode of the light-emitting element; a second initialization transistor including a gate electrode which receives a second initialization gate signal, a first electrode which receives the first initialization voltage, and a second electrode connected to the fourth node; a bypass transistor including a gate electrode which receives a bypass gate signal, a first electrode connected to a second initialization voltage line which transmits a second initialization voltage, and a second electrode connected to the first electrode of the light-emitting element; and a second capacitor including a first electrode which receives the second high power voltage and a second electrode connected to the fourth node.

In an embodiment, the second initialization voltage line may be separate or electrically disconnected from the low power line.

In an embodiment, a frame may include a display scan period in which the data voltage is written and a self-scan period in which the data voltage is not written. The second initialization gate signal may have a turn-on voltage level in a first initialization period of the display scan period and a second initialization period of the self-scan period.

In an embodiment, the first initialization gate signal may have a turn-on voltage level in the first initialization period, and may have a turn-off voltage level in the second initialization period.

A display device according to embodiments may include a display panel including a plurality of pixels; a scan driver which sequentially provides scan signals to the plurality of pixels; and a data driver which supplies a data voltage and a constant current generation voltage to each of the plurality of pixels. Each of the plurality of pixels may include a light-emitting element including a first electrode and a second electrode connected to a low power line which transmits a low power voltage, a pulse width modulator which controls an emission time duration of the light-emitting element based on the data voltage and a sweep signal, and a constant current generator which supplies a driving current having a constant level to the light-emitting element based on the constant current generation voltage. The sweep signal may have a first high voltage level in a non-emission period, and may be boosted to a second high voltage level, which is higher than the first high voltage level, before decreasing to a low voltage level lower than the first high voltage level in an emission period.

In the pixel and the display device according to the embodiments, the sweep signal may be boosted to the second high voltage level before the sweep signal decreases in the emission period, thereby preventing an increase in the data voltage and the high gate voltage, and consequently reducing the power consumption of the pixel.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION OF THE EMBODIMENTS

Figure 1:
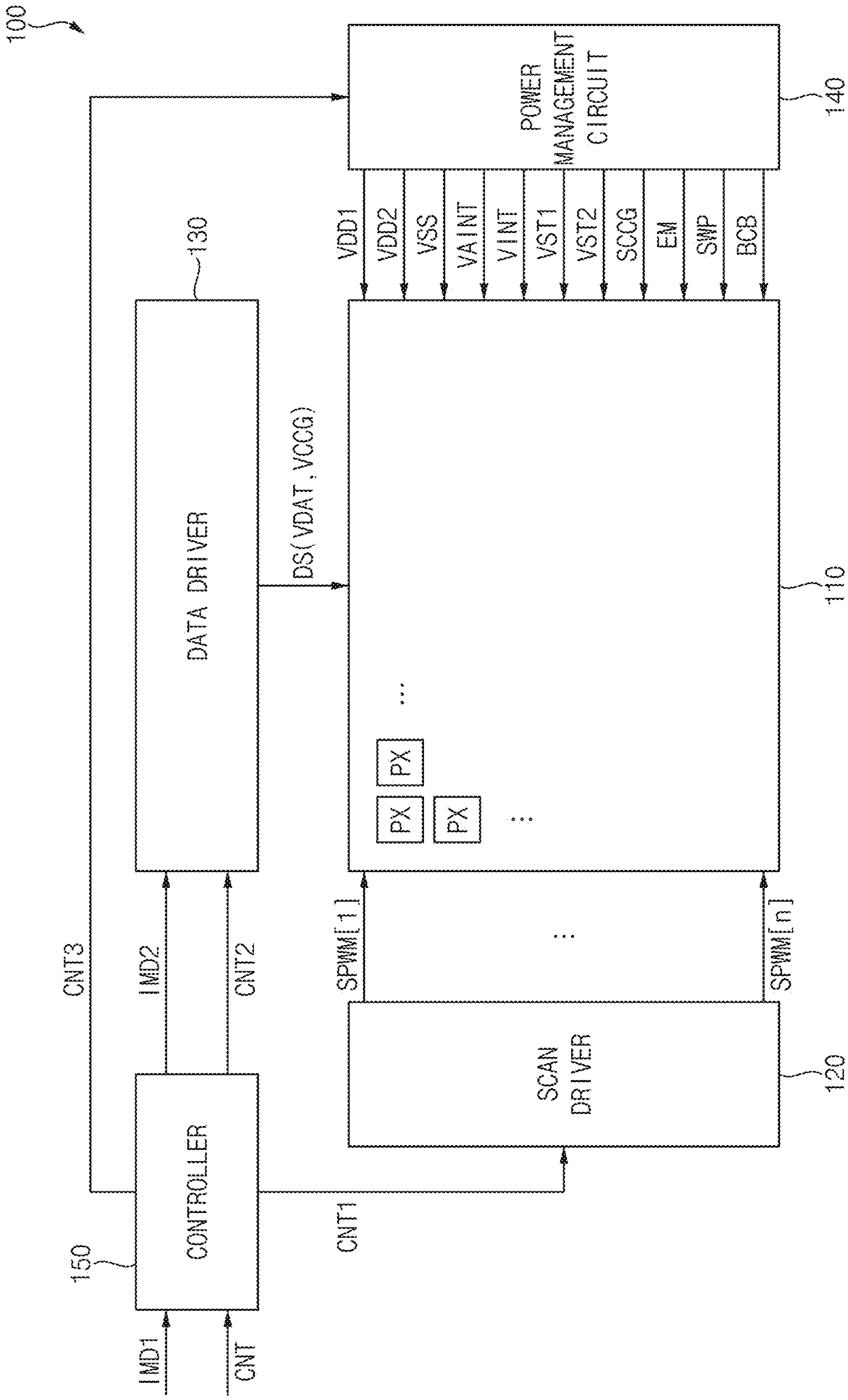
FIG. 1 is a schematic block diagram showing a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Various embodiments do not have to be exclusive nor limit the disclosure. For example, specific shapes, configurations, and characteristics of an embodiment may be used or implemented in another embodiment.

In the drawings, sizes, thicknesses, ratios, and dimensions of the elements may be exaggerated for ease of description and for clarity. Like reference numbers and/or reference characters refer to like elements throughout.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms "first," "second," etc. may be used herein to describe various elements, these elements should not be limited by these terms. These terms are only used to distinguish one element from another. For example, a first element may be referred to as a second element, and similarly, a second element may be referred to as a first element without departing from the scope of the disclosure.

As used herein, the singular forms "a," "an," and "the" are intended to include the plural forms as well, unless the context clearly indicates otherwise.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

It will be understood that when an element (or a layer, a region, a portion, or the like) is referred to as "formed on," "being on," "disposed on," "connected to," or "coupled to" another element in the specification, it can be directly formed on, disposed on, connected or coupled to another element mentioned above, or intervening elements may be disposed therebetween. It will be understood that the terms "connected to" or "coupled to" may include a physical or electrical connection or coupling.

The phrase "in a plan view" means viewing the object from the top, and the phrase "in a schematic cross-sectional view" means viewing a cross-section of which the object is vertically cut from the side. Hence, the expression "in a plan view" used herein may mean that an object is viewed in the third z direction from the top. The phrase "in a schematic cross-sectional view" means viewing a cross-section in the first x direction or the second y direction of which the object is vertically cut from the side. The third z direction also can be referred to as a "thickness direction."

The spatially relative terms "below," "beneath," "lower," "above," "upper," or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Hereinafter, a pixel and a display device according to embodiments of the disclosure will be described in more detail with reference to the accompanying drawings.

FIG. 1 is a schematic block diagram showing a display device 100 according to an embodiment.

Referring to FIG. 1, a display device 100 may include a display panel 110, a scan driver 120, a data driver 130, a power management circuit 140, and a controller 150.

The display panel 110 may include pixels PX. In an embodiment, the pixels PX may include a first pixel emitting light having a first color, a second pixel emitting light having a second color, and a third pixel emitting light having a third color. For example, the first color, the second color, and the third color may be red, green, and blue, respectively.

The scan driver 120 may sequentially provide first to $n^{th}$ (where n is a natural number greater than 1) scan signals SPWM[1]-SPWM[n] to the pixels PX. The scan driver 120 may sequentially generate the first to $n^{th}$ scan signals SPWM [1]-SPWM[n] respectively corresponding to first to $n^{th}$ pixel rows based on a first control signal CNT1. The first control signal CNT1 may include a scan clock signal, a scan start signal, etc.

The data driver 130 may provide data signals DS to the pixels PX. The data signal DS may include a data voltage VDAT and a constant current generation voltage VCCG. The data driver 130 may generate the data signals DS respectively corresponding to pixel columns based on second image data IMD2 and a second control signal CNT2. In an embodiment, the second image data IMD2 may include grayscale values respectively corresponding to the pixels PX. The second control signal CNT2 may include a data clock signal, a horizontal start signal, a load signal, etc.

The power management circuit 140 may commonly provide a first high power voltage VDD1, a second high power voltage VDD2, a low power voltage VSS, a first initialization voltage VINT, a second initialization voltage VAINT, a first initialization gate signal VST1, a second initialization gate signal VST2, a constant current generation scan signal SCCG, an emission control signal EM, a sweep signal SWP, and a bypass gate signal BCB to the pixels PX. The power management circuit 140 may generate the first high power voltage VDD1, the second high power voltage VDD2, the low power voltage VSS, the first initialization voltage VINT, the second initialization voltage VAINT, the first initialization gate signal VST1, the second initialization gate signal VST2, the constant current generation scan signal SCCG, the emission control signal EM, the sweep signal SWP, and the bypass gate signal BCB based on a third control signal CNT3.

The controller 150 may control an operation (or driving) of the scan driver 120, an operation (or driving) of the data driver 130, and an operation (or driving) of the power management circuit 140. The controller 150 may generate the first control signal CNT1, the second image data IMD2, the second control signal CNT2, and the third control signal CNT3 based on first image data IMD1 and a control signal CNT. In an embodiment, the first image data IMD1 may include grayscale values respectively corresponding to the pixels PX. The controller 150 may convert the first image data IMD1 into the second image data IMD2. The control signal CNT may include a master clock signal, a vertical synchronization signal, a horizontal synchronization signal, a data enable signal, etc.

Figure 2:
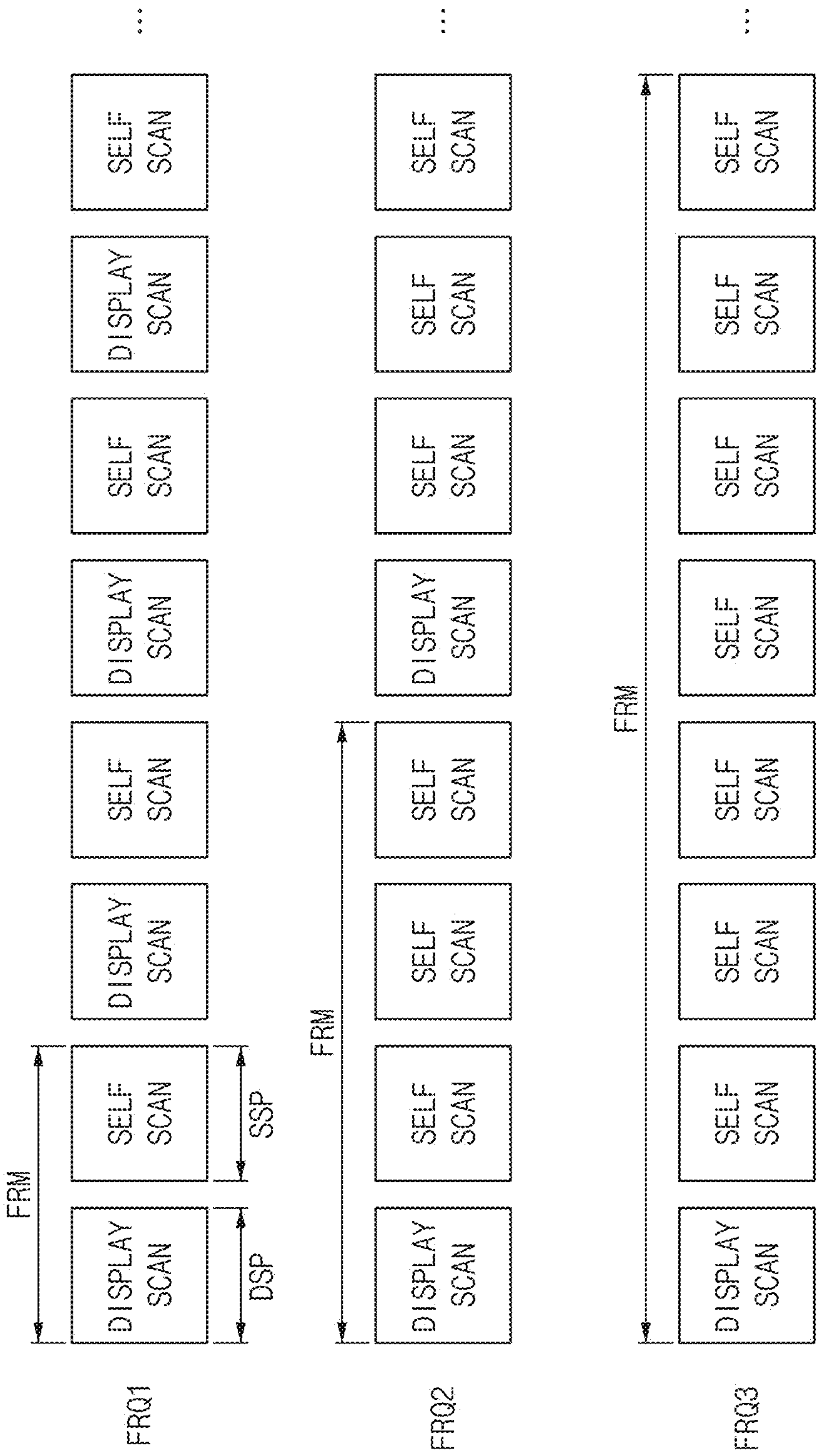
FIG. 2 is a schematic view describing a variable refresh rate driving of the display device of FIG. 1.

FIG. 2 is a schematic view describing a variable refresh rate driving of the display device 100 of FIG. 1.

Referring to FIGS. 1 and 2, the display device 100 may display an image using a variable refresh rate driving method in which a driving frequency may change. The driving frequency may represent a frequency (in other words, the number of frames FRM) at which images are displayed from the display device 100 per 1 second.

Each of the frames FRM of the display device 100 may include a display scan period DSP and at least one self-scan period SSP. In the display scan period DSP, the data voltage VDAT may be written to the pixel PX, and the pixel PX may emit light for a time period corresponding to the written data voltage VDAT. In the self-scan period SSP, the data voltage VDAT may not be written to the pixel PX, and the pixel PX may emit light for a time period corresponding to the data voltage VDAT written to the pixel PX in the display scan period DSP.

In an embodiment, a length of the display scan period DSP may be equal to a length of the self-scan period SSP. However, the number of self-scan periods SSP included in each frame FRM may vary depending on the driving frequency. For example, in the case where the driving frequency decreases, the number of self-scan periods SSP included in the frame FRM may increase.

In the case where the display device 100 operates at a first frequency FRQ1 (e.g., 120 Hz), each FRM may include one display scan period DSP and one self-scan period SSP. In the case where the display device 100 operates at a second frequency FRQ2 (e.g., 60 Hz), which is lower than the first frequency FRQ1, the frame FRM may include one display scan period DSP and three consecutive self-scan periods SSP. Similarly, in the case where the display device 100 operates at a third frequency FRQ3 (e.g., 30 Hz), which is lower than the second frequency FRQ2, the frame FRM may include one display scan period DSP and seven consecutive self-scan periods SSP.

Figure 3:
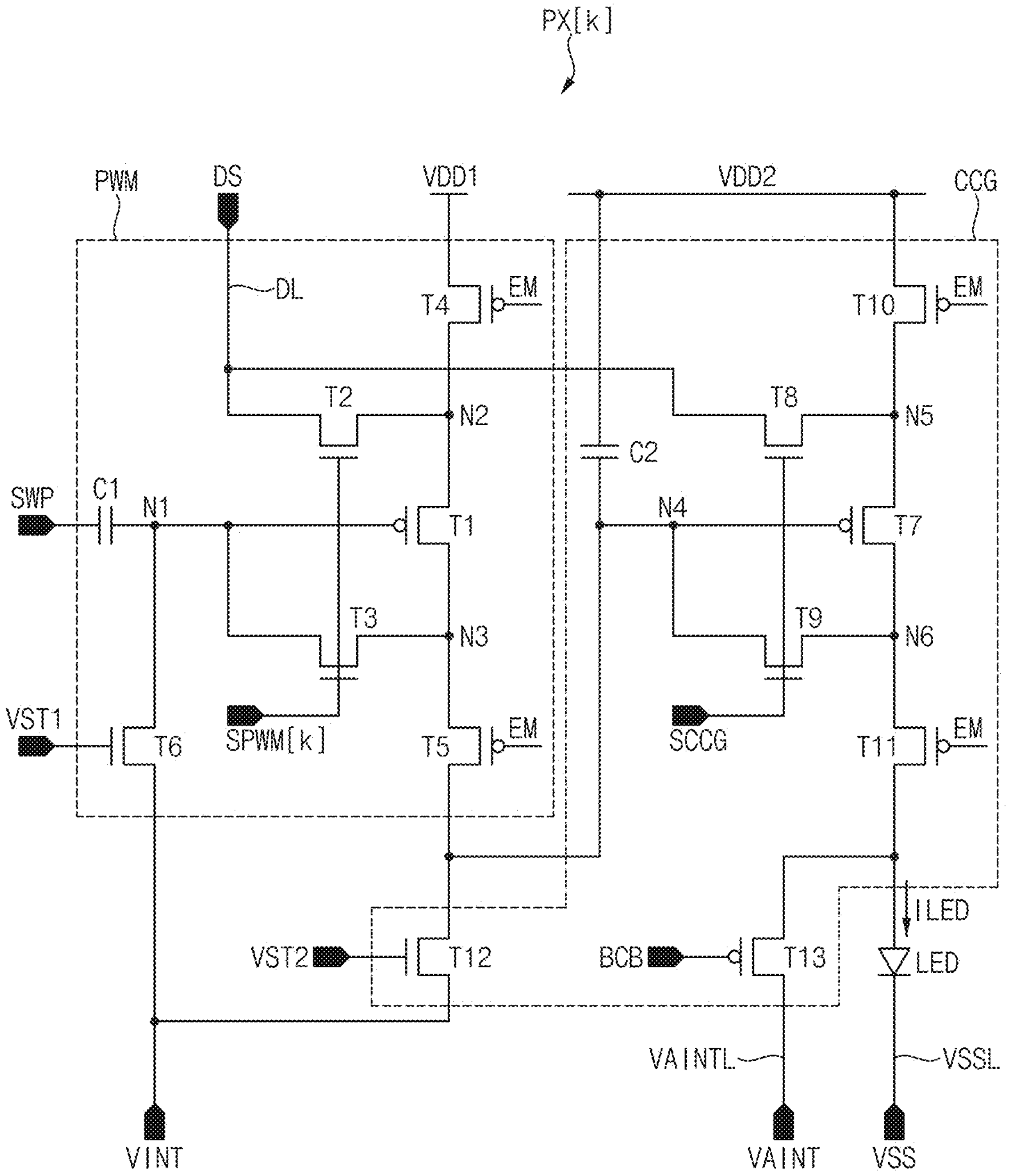
FIG. 3 is a schematic circuit diagram showing a pixel according to an embodiment.

FIG. 3 is a schematic circuit diagram showing a pixel PX[k] according to an embodiment. FIG. 3 may represent a pixel PX[k] included in a kth pixel row (where kis a natural number greater than or equal to 1 and less than or equal to n) among the pixels PX of FIG. 1.

Referring to FIGS. 1 to 3, the pixel PX[k] may include a light-emitting element LED, a pulse width modulator PWM, and a constant current generator CCG. The light-emitting element LED may emit light based on a driving current ILED. The light-emitting element LED may include a first electrode and a second electrode connected to a low power line VSSL that supplies the low power voltage VSS.

In an embodiment, the light-emitting element LED may be a micro light-emitting diode. The micro light-emitting diode may be defined as an ultra-small light-emitting diode having a size of less than or equal to about 100 μm.

The pulse width modulator PWM may control an emission time duration of the light-emitting element LED based on the data voltage VDAT and the sweep signal SWP.

In an embodiment, the pulse width modulator PWM may include a first driving transistor (hereinafter referred to as a first transistor) T1, a first write transistor (hereinafter referred to as a second transistor) T2, a first compensation transistor (hereinafter referred to as a third transistor) T3, a first emission control transistor (hereinafter referred to as a fourth transistor) T4, a second emission control transistor (hereinafter referred to as a fifth transistor) T5, a first initialization transistor (hereinafter referred to as a sixth transistor) T6, and a first capacitor C1.

The constant current generator CCG may provide the driving current ILED having a constant level to the light-emitting element LED based on the constant current generation voltage VCCG.

In an embodiment, the constant current generator CCG may include a second driving transistor (hereinafter referred to as a seventh transistor) T7, a second write transistor (hereinafter referred to as an eighth transistor) T8, a second compensation transistor (hereinafter referred to as a ninth transistor) T9, a third emission control transistor (hereinafter referred to as a tenth transistor) T10, a fourth emission control transistor (hereinafter referred to as an eleventh transistor) T11, a second initialization transistor (hereinafter referred to as a twelfth transistor) T12, a bypass transistor (hereinafter referred to as a thirteenth transistor) T13, and a second capacitor C2.

The first transistor T1 may include a gate electrode connected to a first node N1, a first electrode connected to a second node N2, and a second electrode connected to a third node N3. The first transistor T1 may be turned on based on a voltage difference between the second node N2 and the first node N1.

The second transistor T2 may include a gate electrode that receives the scan signal SPWM[k] corresponding to the pixel PX[k], a first electrode connected to a data line DL that transmits the data signal DS, and a second electrode connected to the second node N2. The second transistor T2 may transmit the data voltage VDAT to the second node N2 in response to the scan signal SPWM[k] having a turn-on voltage level.

The third transistor T3 may include a gate electrode that receives the scan signal SPWM[k], a first electrode connected to the third node N3, and a second electrode connected to the first node N1. The third transistor T3 may connect the third node N3 and the first node N1 in response to the scan signal SPWM[k] having the turn-on voltage level. In other words, the third transistor T3 may diode-connect the first transistor T1 in response to the scan signal SPWM[k] having the turn-on voltage level.

The fourth transistor T4 may include a gate electrode that receives the emission control signal EM, a first electrode that receives the first high power voltage VDD1, and a second electrode connected to the second node N2. The fourth transistor T4 may transmit the first high power voltage VDD1 to the second node N2 in response to the emission control signal EM having a turn-on voltage level.

The fifth transistor T5 may include a gate electrode that receives the emission control signal EM, a first electrode connected to the third node N3, and a second electrode connected to a fourth node N4. The fifth transistor T5 may connect the third node N3 and the fourth node N4 in response to the emission control signal EM having the turn-on voltage level.

The sixth transistor T6 may include a gate electrode that receives the first initialization gate signal VST1, a first electrode that receives the first initialization voltage VINT, and a second electrode connected to the first node N1. The sixth transistor T6 may transmit the first initialization voltage VINT to the first node N1 in response to the first initialization gate signal VST1 having a turn-on voltage level.

The seventh transistor T7 may include a gate electrode connected to the fourth node N4, a first electrode connected to a fifth node N5, and a second electrode connected to a sixth node N6. The seventh transistor T7 may generate the driving current ILED corresponding to a voltage difference between the fifth node N5 and the fourth node N4.

The eighth transistor T8 may include a gate electrode that receives the constant current generation scan signal SCCG, a first electrode connected to the data line DL, and a second electrode connected to the fifth node N5. The eighth transistor T8 may transmit the constant current generation voltage VCCG to the fifth node N5 in response to the constant current generation scan signal SCCG having a turn-on voltage level.

The ninth transistor T9 may include a gate electrode that receives the constant current generation scan signal SCCG, a first electrode connected to the sixth node N6, and a second electrode connected to the fourth node N4. The ninth transistor T9 may connect the sixth node N6 and the fourth node N4 in response to the constant current generation scan signal SCCG having the turn-on voltage level. In other words, the ninth transistor T9 may diode-connect the seventh transistor T7 in response to the constant current generation scan signal SCCG having the turn-on voltage level.

The tenth transistor T10 may include a gate electrode that receives the emission control signal EM, a first electrode that receives the second high power voltage VDD2, and a second electrode connected to the fifth node N5. The tenth transistor T10 may transmit the second high power voltage VDD2 to the fifth node N5 in response to the emission control signal EM having the turn-on voltage level.

The eleventh transistor T11 may include a gate electrode that receives the emission control signal EM, a first electrode connected to the sixth node N6, and a second electrode connected to the first electrode of the light-emitting element LED. The eleventh transistor T11 may connect the sixth node N6 and the first electrode of the light-emitting element LED in response to the emission control signal EM having the turn-on voltage level.

The twelfth transistor T12 may include a gate electrode that receives the second initialization gate signal VST2, a first electrode that receives the first initialization voltage VINT, and a second electrode connected to the fourth node N4. The twelfth transistor T12 may transmit the first initialization voltage VINT to the fourth node N4 in response to the second initialization gate signal VST2 having a turn-on voltage level.

The thirteenth transistor T13 may include a gate electrode that receives the bypass gate signal BCB, a first electrode connected to a second initialization voltage line VAINTL that transmits the second initialization voltage VAINT, and a second electrode connected to the first electrode of the light-emitting element LED. The thirteenth transistor T13 may transmit the second initialization voltage VAINT to the first electrode of the light-emitting element LED in response to the bypass gate signal BCB having a turn-on voltage level.

The second initialization voltage line VAINTL may be separate or electrically disconnected from the low power line VSSL.

When the second initialization voltage line VAINTL is connected to the low power line VSSL (in other words, in the case where the first electrode of the thirteenth transistor T13 is connected to the second electrode of the light-emitting element LED), a leakage current flowing through the light-emitting element LED may increase as the light-emitting element LED and the thirteenth transistor T13 are connected in parallel. The leakage current flowing through the light-emitting element LED may cause the light-emitting element LED to unintentionally emit light, thereby deteriorating the black display characteristics of the display device 100 in the case of displaying black.

In an embodiment, the second initialization voltage line VAINTL may be separate or electrically disconnected from the low power line VSSL, allowing a current path to be formed from the first electrode of the light-emitting element LED to the second initialization voltage line VAINTL through the thirteenth transistor T13. Accordingly, the leakage current flowing through the light-emitting element LED may be reduced, improving the black display characteristic of the display device 100.

In an embodiment, each of the first transistor T1, the fourth transistor T4, the fifth transistor T5, the seventh transistor T7, the tenth transistor T10, the eleventh transistor T11, and the thirteenth transistor T13 may be a P-type transistor (e.g., a PMOS transistor), and each of the second transistor T2, the third transistor T3, the sixth transistor T6, the eighth transistor T8, the ninth transistor T9, and the twelfth transistor T12 may be an N-type transistor (e.g., an NMOS transistor). In an embodiment, the P-type transistors may be polycrystalline silicon transistors, and the N-type transistors may be oxide semiconductor transistors.

The first capacitor C1 may include a first electrode that receives the sweep signal SWP and a second electrode connected to the first node N1. The first capacitor C1 may store a voltage of the first node N1. Further, the first capacitor C1 may transmit a change in the sweep signal SWP to the first node N1.

The second capacitor C2 may include a first electrode that receives the second high power voltage VDD2 and a second electrode connected to the fourth node N4. The second capacitor C2 may store a voltage of the fourth node N4.

Figure 4:
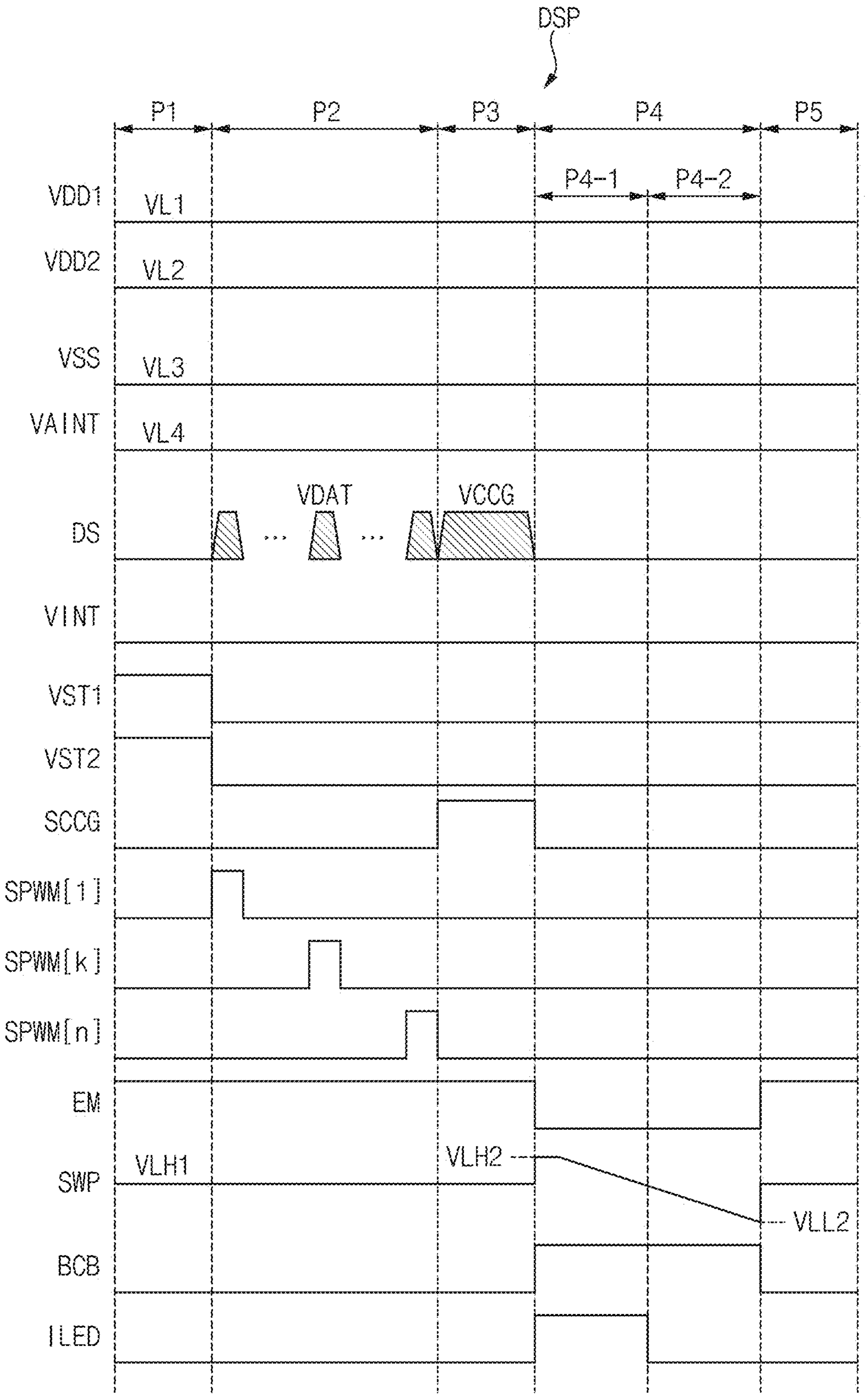
FIG. 4 is a schematic view showing an example of signals and voltages provided to the pixels of FIG. 1 in a display scan period.

FIG. 4 is a schematic view showing an example of signals and voltages provided to the pixels PX of FIG. 1 in the display scan period DSP.

Referring to FIGS. 1 to 4, the display scan period DSP may include a first initialization period (hereinafter referred to as a first period) P1 in which the gate electrode of the first transistor T1 and the gate electrode of the seventh transistor T7 are initialized; a first write period (hereinafter referred to as a second period) P2 in which the data voltage VDAT, compensated for a threshold voltage of the first transistor T1, is written to the gate electrode of the first transistor T1; a second write period (hereinafter referred to as a third period) P3 in which the constant current generation voltage VCCG, compensated for a threshold voltage of the seventh transistor T7, is written to the gate electrode of the seventh transistor T7; a first emission period (hereinafter referred to as a fourth period) P4 in which the light-emitting element LED emits light; and a first bypass period (hereinafter referred to as a fifth period) P5 in which charges of the light-emitting element LED are discharged. The fourth period P4 may include a fourth-first period P4-1, in which a constant level of driving current ILED flows through the light-emitting element LED, and a fourth-second period P4-2, in which no driving current ILED flows through the light-emitting element LED. The periods P1-P3 and P5 excluding the fourth period P4 among the display scan period DSP may be non-emission periods.

The first high power voltage VDD1, the second high power voltage VDD2, the low power voltage VSS, the second initialization voltage VAINT, the first initialization voltage VINT, the first initialization gate signal VST1, the second initialization gate signal VST2, the constant current generation scan signal SCCG, the emission control signal EM, the sweep signal SWP, and the bypass gate signal BCB may be commonly provided to the pixels PX. The scan signals SPWM[1], . . . , SPWM[k], . . . , SPWM[n] may be sequentially provided to the pixels PX on a row-by-row basis.

Each of the first high power voltage VDD1, the second high power voltage VDD2, the low power voltage VSS, the second initialization voltage VAINT, and the first initialization voltage VINT may be a constant voltage having a constant voltage level. In an embodiment, a voltage level VL1 of the first high power voltage VDD1 may be higher than a voltage level VL2 of the second high power voltage VDD2. For example, the voltage level VL1 of the first high power voltage VDD1 may be about 5.2 V, and the voltage level VL2 of the second high power voltage VDD2 may be about 4.6 V. In an embodiment, a voltage level VL4 of the second initialization voltage VAINT may be higher than or equal to a voltage level VL3 of the low power voltage VSS. For example, the voltage level VL3 of the low power voltage VSS may be about −5 V, and the voltage level VL4 of the second initialization voltage VAINT may be about −4 V to about −5 V.

The data signal DS may have the data voltage VDAT in the second period P2 and the constant current generation voltage VCCG in the third period P3.

Each of the first initialization gate signal VST1 and the second initialization gate signal VST2 may have a turn-on voltage level (e.g., high gate voltage) in the first period P1, and a turn-off voltage level (e.g., low gate voltage) in the second to fifth periods P2-P5.

The constant current generation scan signal SCCG may have a turn-on voltage level (e.g., high gate voltage) in the third period P3 and, may have a turn-off voltage level (e.g., low gate voltage) in the first, second, fourth, and fifth periods P1, P2, P4, and P5.

Each of the scan signals SPWM[1], . . . , SPWM[k], . . . , SPWM[n] may have a turn-on voltage level (e.g., high gate voltage) in the second period P2, and may have a turn-off voltage level (e.g., low gate voltage) in the first, third to fifth periods P1 and P3-P5. The scan signals SPWM[1], . . . , SPWM[k], . . . , SPWM[n] may be sequentially shifted by a selected time period (e.g., 1 horizontal time).

The emission control signal EM may have a turn-on voltage level (e.g., low gate voltage) in the fourth period P4, and may have a turn-off voltage level (e.g., high gate voltage) in the first to third and fifth periods P1-P3 and P5.

The sweep signal SWP may have a first high voltage level VLH1 in the first to third and fifth periods P1-P3 and P5. In the fourth period P4, the sweep signal SWP may be boosted to a second high voltage level VLH2, which is higher than the first high voltage level VLH1, before decreasing to a second low voltage level VLL2, which is lower than the first high voltage level VLH1, and may decrease from the second high voltage level VLH2 to the second low voltage level VLL2.

In an embodiment, the sweep signal SWP may maintain the second high voltage level VLH2 for a selected time period before decreasing to the second low voltage level VLL2 in the fourth period P4.

In an embodiment, the sweep signal SWP may linearly decrease from the second high voltage level VLH2 to the second low voltage level VLL2 in the fourth period P4.

The bypass gate signal BCB may have a turn-on voltage level (e.g., low gate voltage) in the first to third and fifth periods P1-P3 and P5, and may have a turn-off voltage level (e.g., high gate voltage) in the fourth period P4.

FIGS. 5 to 10 are schematic views describing an operation of the pixel PX[k] of FIG. 3 in the display scan period DSP.

Figure 5:
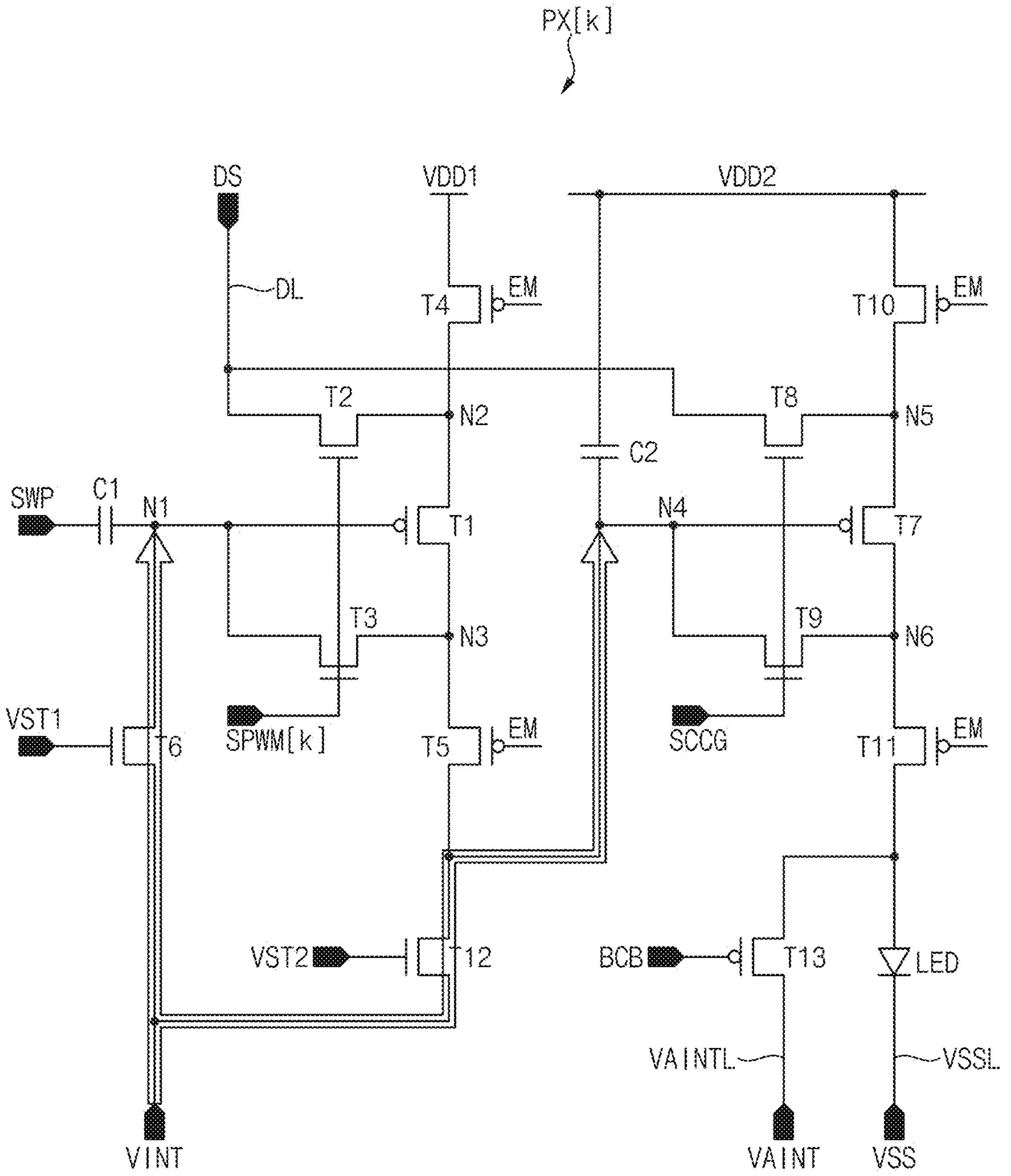
FIGS. 5 to 10 are schematic views describing an operation of the pixel of FIG. 3 in the display scan period.

Referring to FIGS. 4 and 5, in the first period P1, the sixth transistor T6 may be turned on in response to the first initialization gate signal VST1 having the turn-on voltage level, and the twelfth transistor T12 may be turned on in response to the second initialization gate signal VST2 having the turn-on voltage level. Accordingly, the first initialization voltage VINT may be applied to the first node N1 through the sixth transistor T6, the first initialization voltage VINT may be applied to the fourth node N4 through the twelfth transistor T12, thereby initializing the gate electrode of the first transistor T1 and the gate electrode of the seventh transistor T7.

Figure 6:
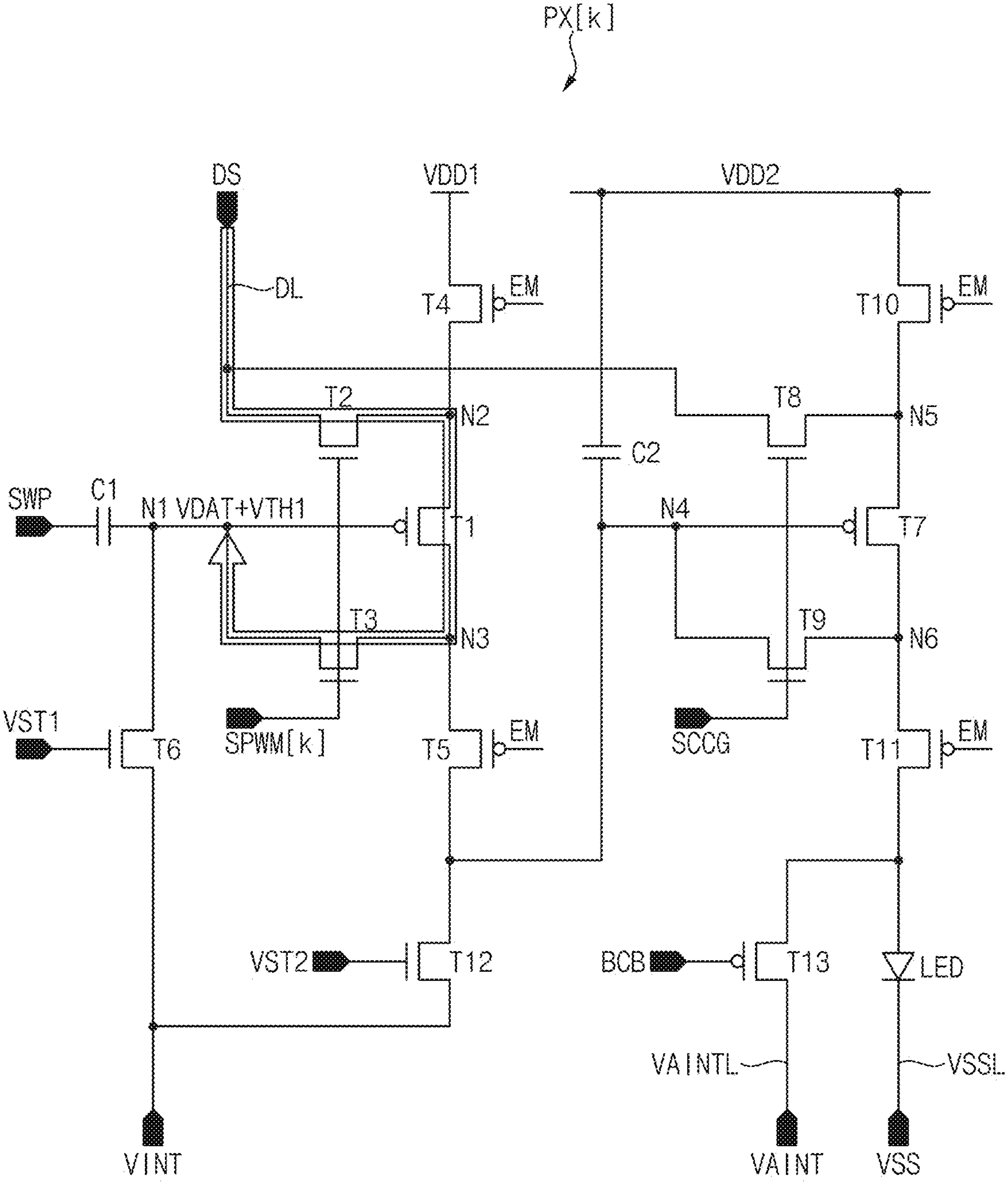

Referring to FIGS. 4 and 6, in the second period P2, the second transistor T2 and the third transistor T3 may be turned on in response to the scan signal SPWM[k] having the turn-on voltage level. Accordingly, the data voltage VDAT, which compensates for the threshold voltage VTH1 of the first transistor T1, may be applied to the first node N1 through the second transistor T2, the first transistor T1, and the third transistor T3.

Figure 7:
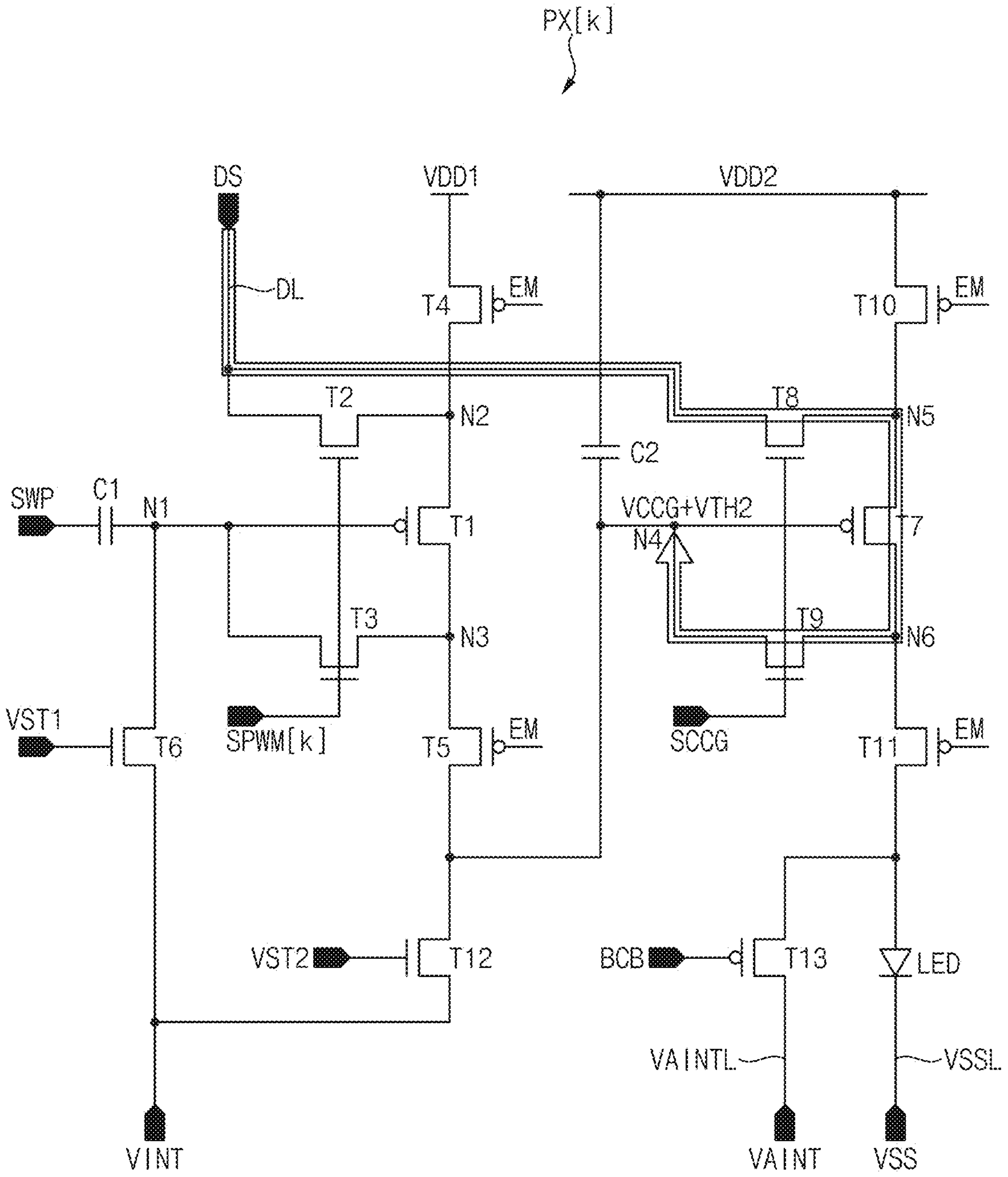

Referring to FIGS. 4 and 7, in the third period P3, the eighth transistor T8 and the ninth transistor T9 may be turned on in response to the constant current generation scan signal SCCG having the turn-on voltage level. Accordingly, the constant current generation voltage VCCG, which compensates for the threshold voltage VTH2 of the seventh transistor T7, may be applied to the fourth node N4 through the eighth transistor T8, the seventh transistor T7, and the ninth transistor T9.

Figure 8:
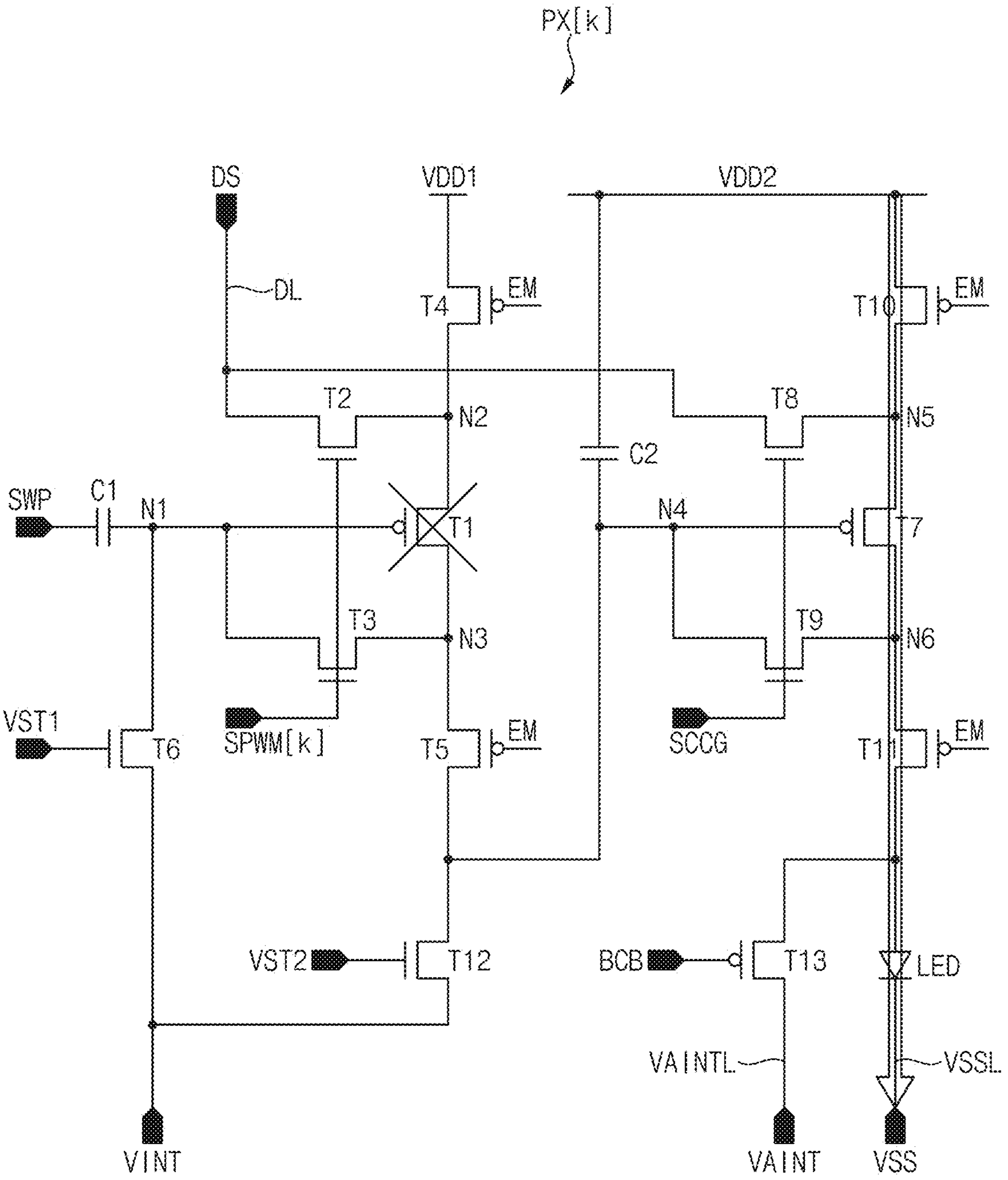
Figure 9:
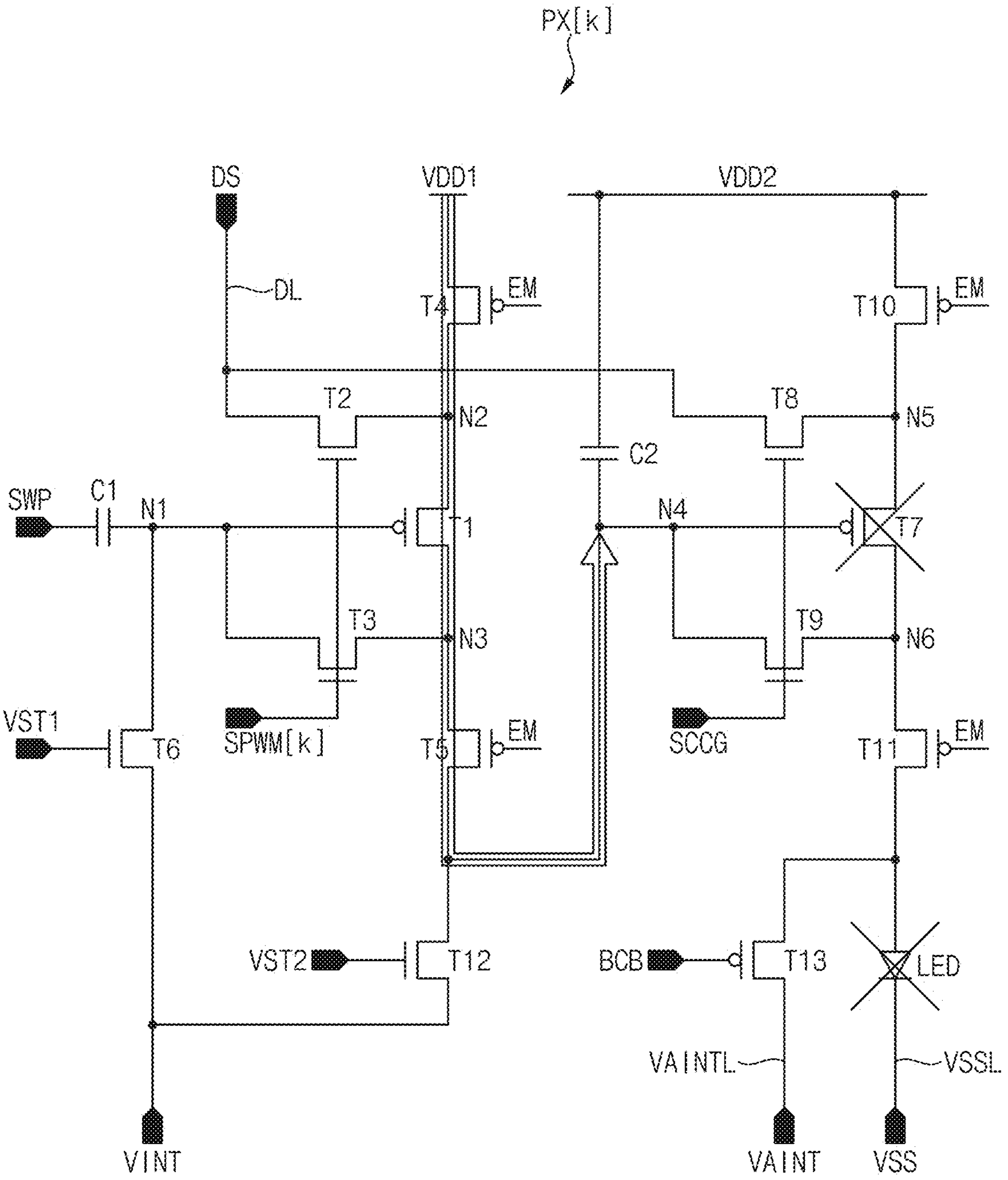

Referring to FIGS. 4, 8, and 9, in the fourth period P4, the emission control signal EM may have the turn-on voltage level, the first high power voltage VDD1 may be applied to the second node N2, and the second high power voltage VDD2 may be applied to the fifth node N5. In the fourth period P4, the sweep signal SWP may be boosted from the first high voltage level VLH1 to the second high voltage level VLH2 and then linearly decrease from the second high voltage level VLH2 to the second low voltage level VLL2, and the change in the sweep signal SWP may be transmitted to the first node N1 by the coupling effect of the first capacitor C1. Accordingly, in the fourth period P4, the voltage at the first node N1 may linearly decrease from the sum of the data voltage VDAT, which compensates for the threshold voltage VTH1 of the first transistor T1, and the second high voltage level VLH2.

As shown in FIG. 8, in the fourth-first period P4-1, a voltage difference between the first electrode and the gate electrode of the first transistor T1 (i.e., a voltage difference between the second node N2 and the first node N1) may be less than the threshold voltage VTH1 of the first transistor T1, resulting in the first transistor T1 being turned off. In the fourth-first period P4-1, the seventh transistor T7 may generate the driving current ILED having a constant level corresponding to a voltage difference between the first electrode and the gate electrode of the seventh transistor T7 (i.e., a voltage difference between the fifth node N5 and the fourth node N4), and the light-emitting element LED may emit light having a brightness corresponding to the driving current ILED.

As shown in FIG. 9, in the fourth-second period P4-2, the voltage difference between the first electrode and the gate electrode of the first transistor T1 (i.e., the voltage difference between the second node N2 and the first node N1) may be greater than the threshold voltage VTH1 of the first transistor T1, resulting in the first transistor T1 being turned on. The first high power voltage VDD1 may be applied to the fourth node N4 through the fourth transistor T4, the first transistor T1, and the fifth transistor T5, causing the seventh transistor T7 to turn off. In the fourth-second period P4-2, the seventh transistor T7 may stop generating the driving current ILED, and the light-emitting element LED may cease emitting light.

In the fourth period P4, the driving current ILED corresponding to the constant current generation voltage VCCG may flow through the light-emitting element LED for a time duration corresponding to the data voltage VDAT, and the light-emitting element LED may emit light having a brightness corresponding to the constant current generation voltage VCCG for a time duration corresponding to the data voltage VDAT. Accordingly, the brightness of the light emitted from the light-emitting element LED may correspond to an emission time of the light-emitting element LED.

Figure 10:
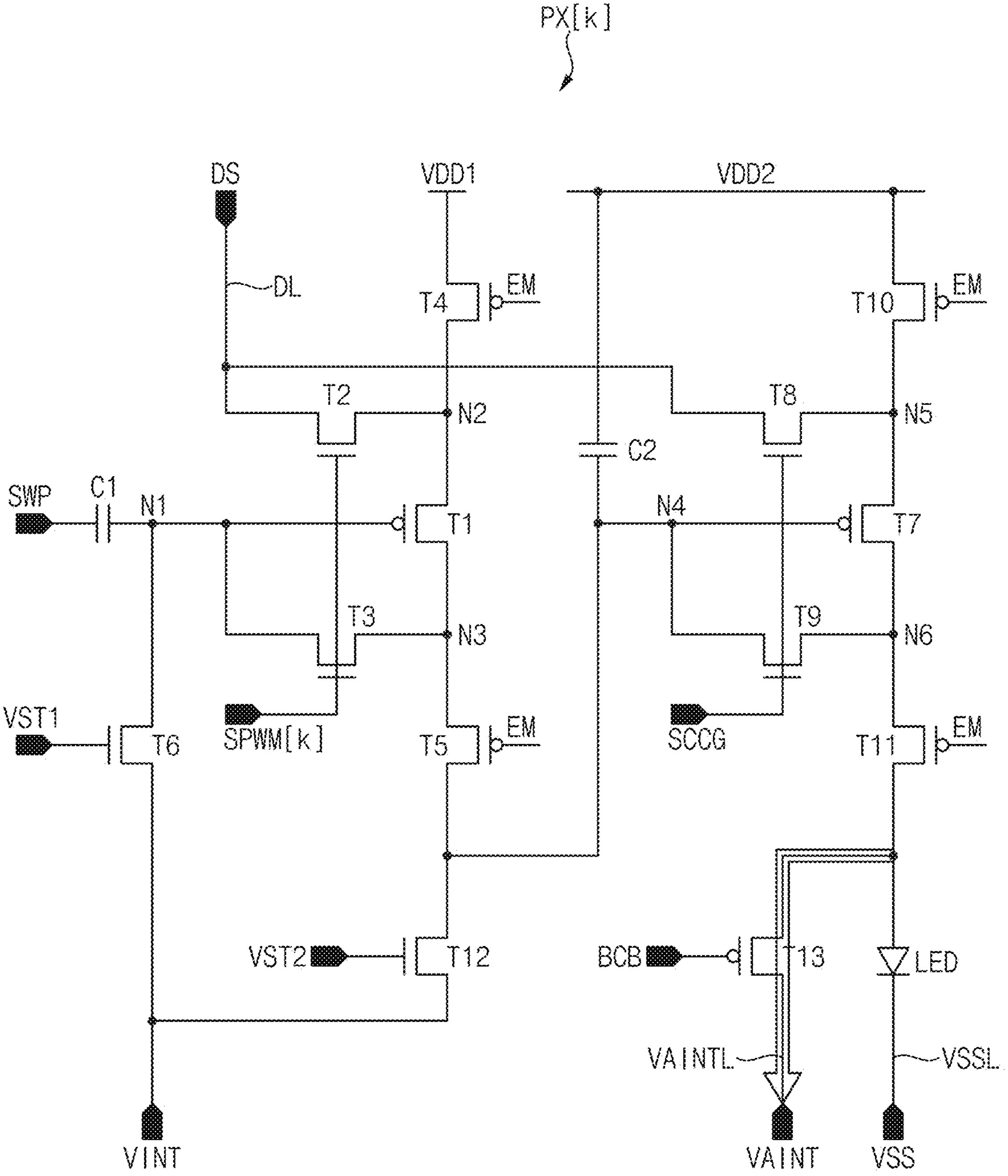

Referring to FIGS. 4 and 10, in the fifth period P5, the thirteenth transistor T13 may be turned on in response to the bypass gate signal BCB having the turn-on voltage level. Accordingly, charges stored in the first electrode of the light-emitting element LED by a parasitic capacitor of the light-emitting element LED may be discharged to the second initialization voltage line VAINTL through the thirteenth transistor T13, preventing a leakage current flowing through the light-emitting element LED.

Figure 11:
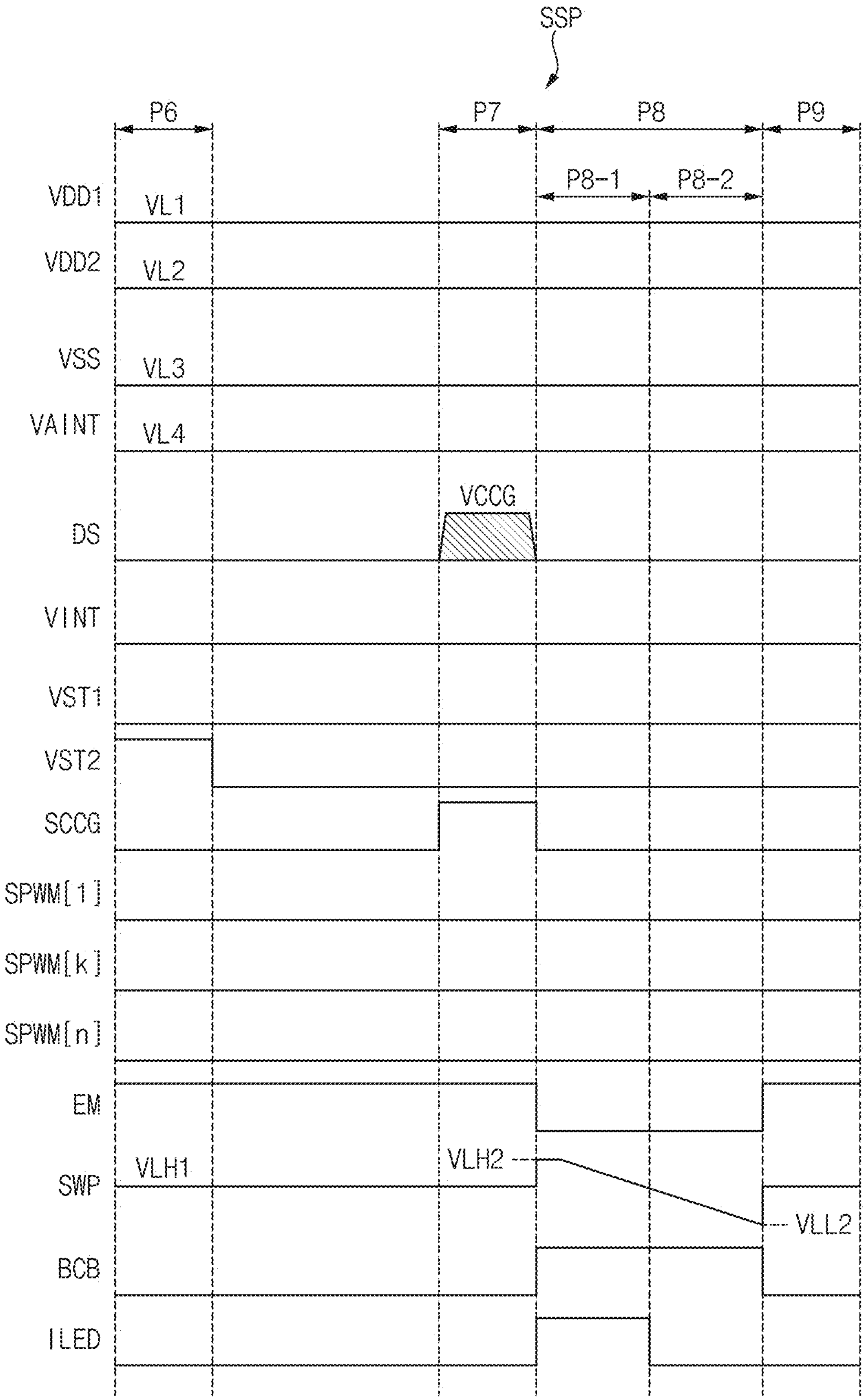
FIG. 11 is a schematic view showing an example of signals and voltages provided to the pixels of FIG. 1 in a self-scan period.

FIG. 11 is a schematic view showing an example of signals and voltages provided to the pixels PX of FIG. 1 in the self-scan period SSP.

Referring to FIGS. 1 to 3 and 11, the self-scan period SSP may include: a second initialization period (hereinafter referred to as a sixth period) P6 in which the gate electrode of the seventh transistor T7 is initialized; a third write period (hereinafter referred to as a seventh period) P7 in which the constant current generation voltage VCCG, compensated for the threshold voltage of the seventh transistor T7, is written to the gate electrode of the seventh transistor T7; a second emission period (hereinafter referred to as an eighth period) P8 in which the light-emitting element LED emits light; and a second bypass period (hereinafter referred to as a ninth period) P9 in which charges of the light-emitting element LED are discharged. The eighth period P8 may include an eighth-first period P8-1, where a constant level of the driving current ILED flows through the light-emitting element LED, and an eighth-second period P8-2, where no driving current ILED flows through the light-emitting element LED. Periods P6, P7, and P9 excluding the eighth period P8 among the self-scan period SSP may be non-emission periods.

Descriptions of components of the signals and the voltages described with reference to FIG. 11, which are substantially the same as or similar to those of the signals and the voltages described with reference to FIG. 4, will be omitted.

The data signal DS may have the constant current generation voltage VCCG in the seventh period P7.

The first initialization gate signal VST1 may have the turn-off voltage level in the sixth to ninth periods P6-P9. The second initialization gate signal VST2 may have the turn-on voltage level in the sixth period P6, and the turn-off voltage level in the seventh to ninth periods P7-P9.

Each of the scan signals SPWM[1], . . . , SPWM[k], . . . , SPWM[n] may have the turn-off voltage level in the sixth to ninth periods P6-P9.

FIGS. 12 to 16 are schematic views describing an operation of the pixel PX[k] of FIG. 3 in the self-scan period SSP.

Figure 12:
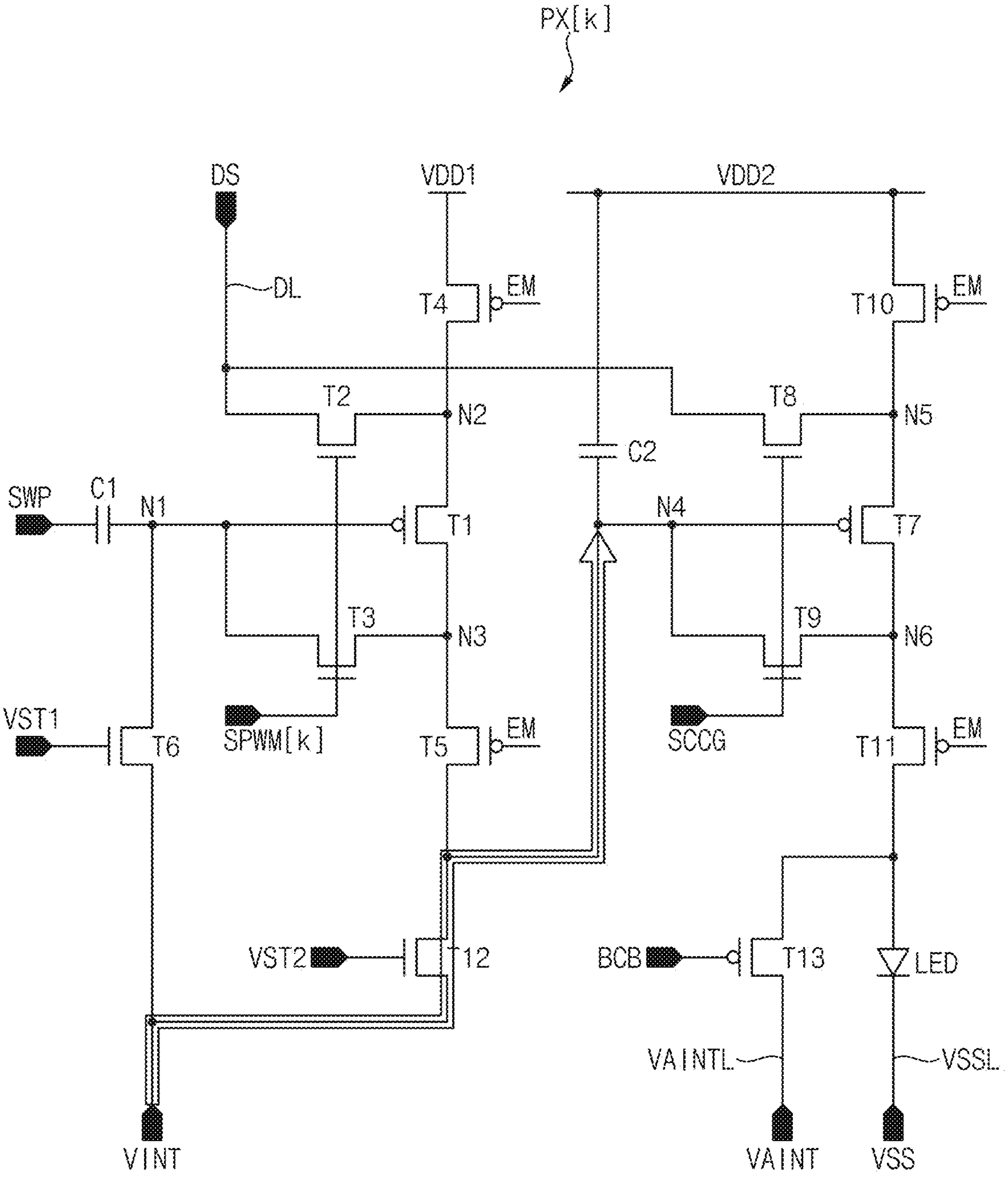
FIGS. 12 to 16 are schematic views describing an operation of the pixel of FIG. 3 in the self-scan period.

Referring to FIGS. 11 and 12, in the sixth period P6, the twelfth transistor T12 may be turned on in response to the second initialization gate signal VST2 having the turn-on voltage level. Accordingly, the first initialization voltage VINT may be applied to the fourth node N4 through the twelfth transistor T12, initializing the gate electrode of the seventh transistor T7.

Figure 13:
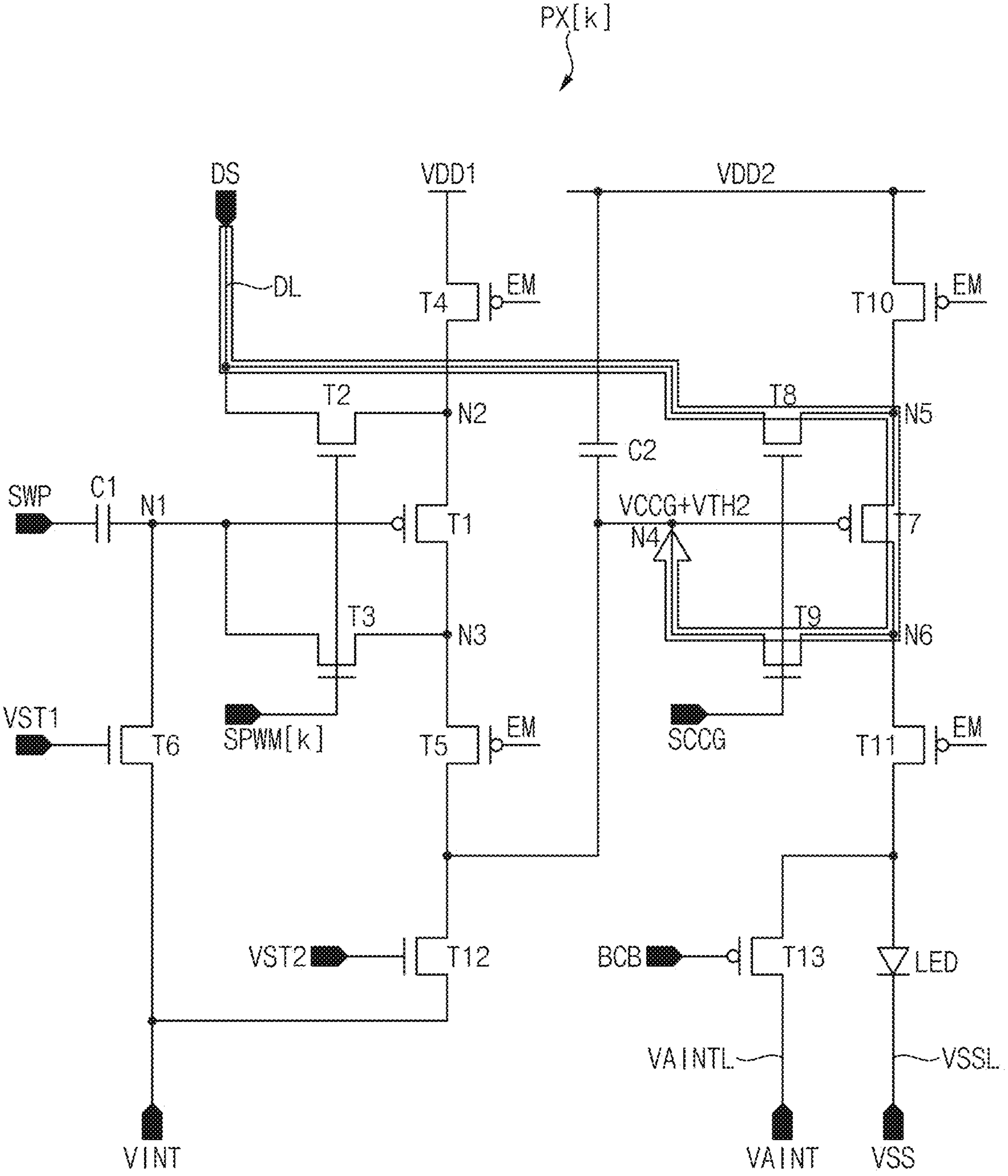

Referring to FIGS. 11 and 13, in the seventh period P7, the eighth transistor T8 and the ninth transistor T9 may be turned on in response to the constant current generation scan signal SCCG having the turn-on voltage level. Accordingly, the constant current generation voltage VCCG, which compensates for the threshold voltage VTH2 of the seventh transistor T7, may be applied to the fourth node N4 through the eighth transistor T8, the seventh transistor T7, and the ninth transistor T9.

Figure 14:
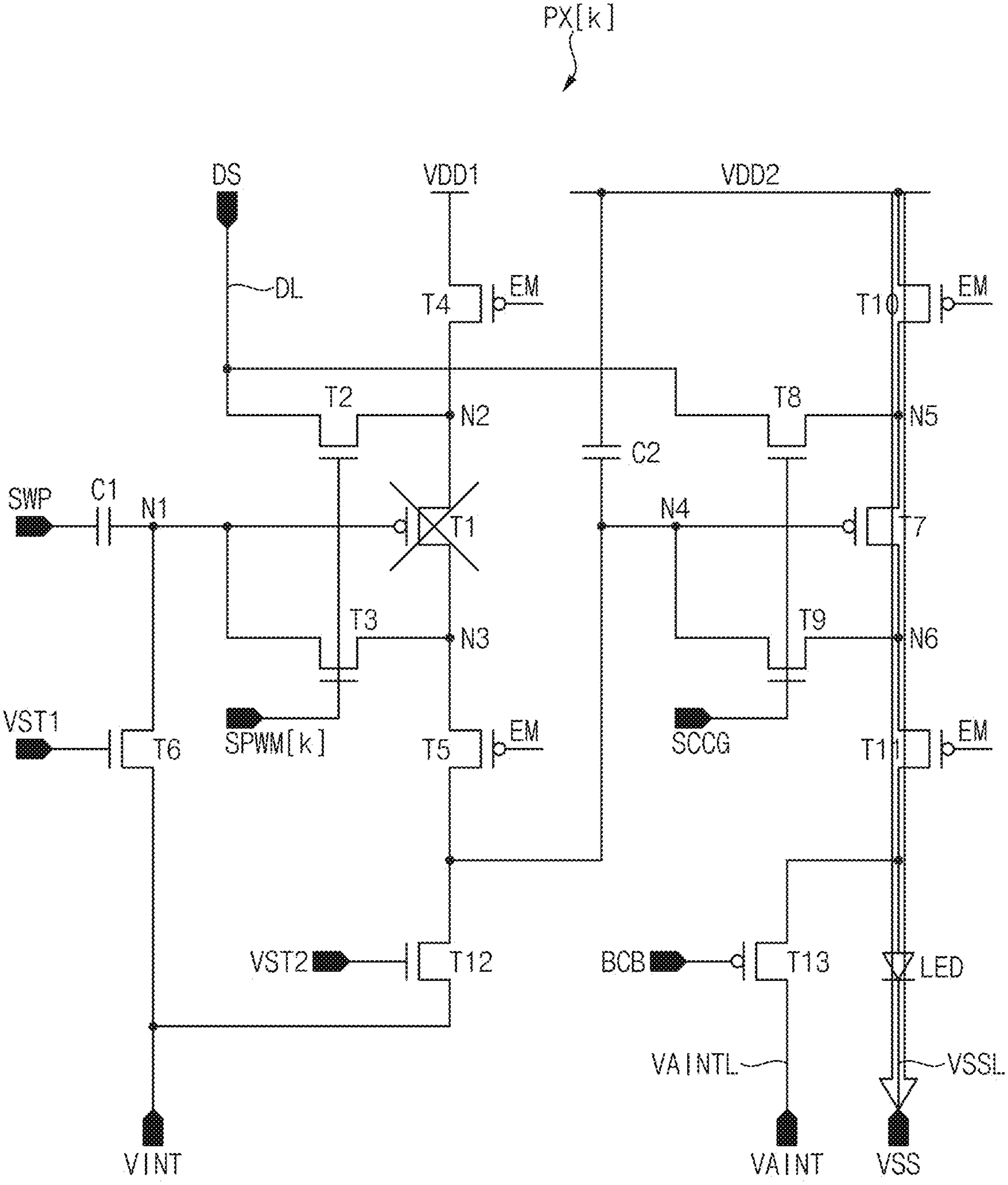
Figure 15:
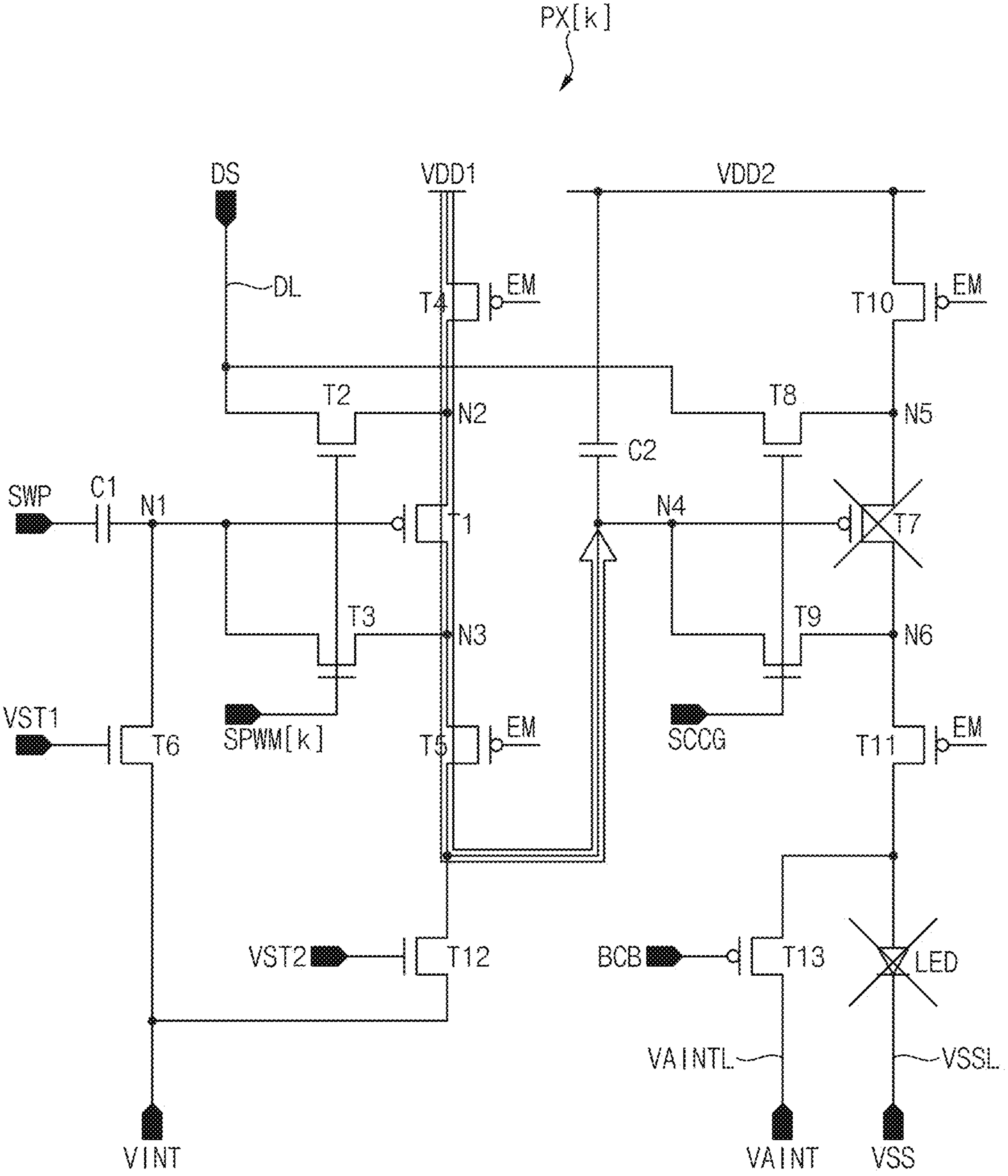

Referring to FIGS. 11, 14, and 15, in the eighth period P8, the emission control signal EM may have the turn-on voltage level, the first high power voltage VDD1 may be applied to the second node N2, and the second high power voltage VDD2 may be applied to the fifth node N5. In the eighth period P8, the sweep signal SWP may be boosted from the first high voltage level VLH1 to the second high voltage level VLH2 and then linearly decrease from the second high voltage level VLH2 to the second low voltage level VLL2. This change in the sweep signal SWP may be transmitted to the first node N1 by the coupling effect of the first capacitor C1. Accordingly, in the eighth period P8, the voltage of the first node N1 may linearly decrease from the sum of the data voltage VDAT, compensated for the threshold voltage VTH1 of the first transistor T1, and the second high voltage level VLH2.

As shown in FIG. 14, in the eighth-first period P8-1, the voltage difference between the first electrode and the gate electrode of the first transistor T1 (i.e., the voltage difference between the second node N2 and the first node N1) may be less than the threshold voltage VTH1 of the first transistor T1, resulting in the first transistor T1 being turned off. In the eighth-first period P8-1, the seventh transistor T7 may generate the driving current ILED having a constant level corresponding to the voltage difference between the first electrode and the gate electrode of the seventh transistor T7 (i.e., the voltage difference between the fifth node N5 and the fourth node N4), causing the light-emitting element LED to emit light having a brightness corresponding to the driving current ILED.

As shown in FIG. 15, in the eighth-second period P8-2, the voltage difference between the first electrode and the gate electrode of the first transistor T1 (i.e., the voltage difference between the second node N2 and the first node N1) may be greater than the threshold voltage VTH1 of the first transistor T1, resulting in the first transistor T1 being turned on. The first high power voltage VDD1 may be applied to the fourth node N4 through the fourth transistor T4, the first transistor T1, and the fifth transistor T5, causing the seventh transistor T7 to turn off. In the eighth-second period P8-2, the seventh transistor T7 may stop generating the driving current ILED, and the light-emitting element LED may not emit light.

In the eighth period P8, a driving current ILED, corresponding to the constant current generation voltage VCCG, may flow through the light-emitting element LED for a time duration corresponding to the data voltage VDAT written in the second period P2, and the light-emitting element LED may emit light having a brightness corresponding to the constant current generation voltage VCCG for a time duration corresponding to the data voltage VDAT written in the second period P2. Accordingly, the brightness of the light emitted from the light-emitting element LED may be proportional to the emission time of the light-emitting element LED.

Figure 16:
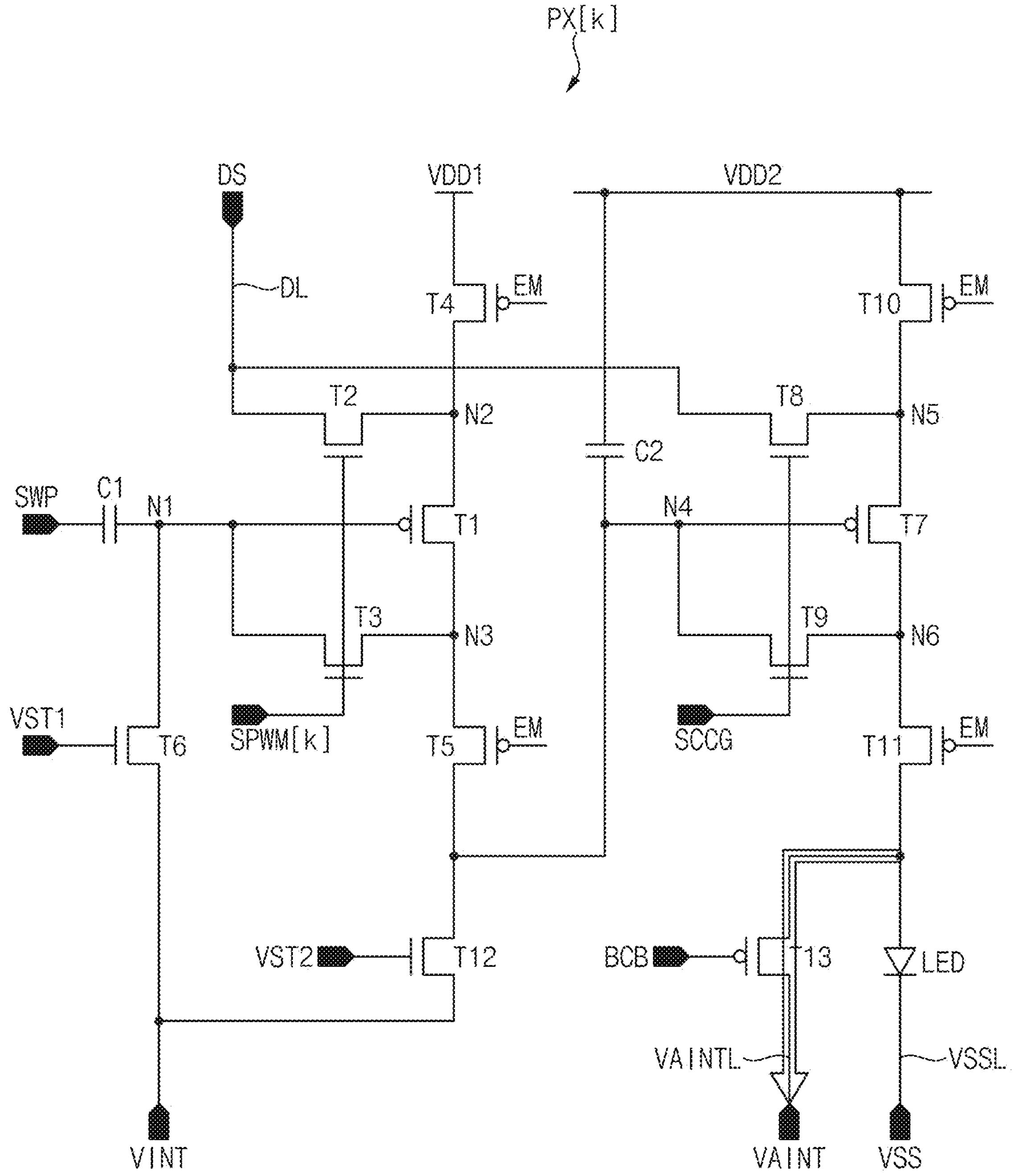

Referring to FIGS. 11 and 16, in the ninth period P9, the thirteenth transistor T13 may be turned on in response to the bypass gate signal BCB having the turn-on voltage level. Accordingly, charges stored in the first electrode of the light-emitting element LED by the parasitic capacitor of the light-emitting element LED may be discharged to the second initialization voltage line VAINTL through the thirteenth transistor T13, preventing the leakage current flowing through the light-emitting element LED.

Figure 17:
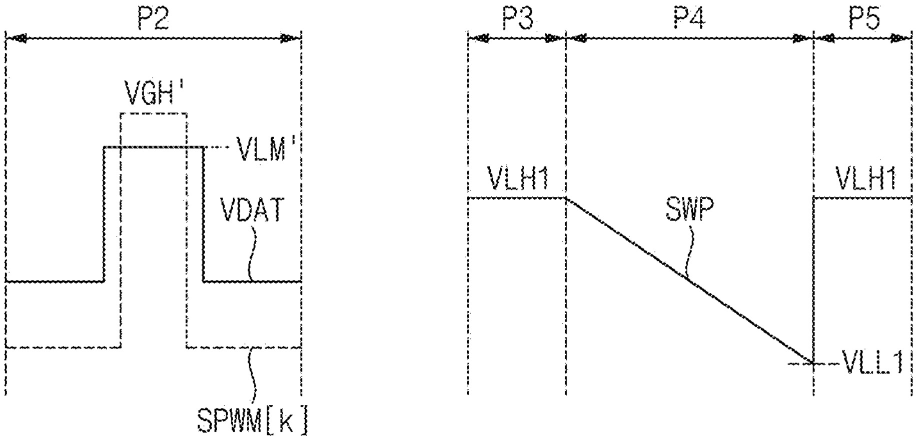
FIG. 17 is a schematic view showing a data voltage, a scan signal, and a sweep signal according to a comparative example.

FIG. 17 is a schematic view showing the data voltage VDAT, the scan signal SPWN[k], and the sweep signal SWP according to a comparative example.

Referring to FIGS. 3 and 17, in a comparative example, the sweep signal SWP may decrease from the first high voltage level VLH1 to a first low voltage level VLL1 in the fourth period P4. The data voltage VDAT may reach the maximum voltage level VLM' in the second period P2, when the pixel PX[k] emits light at the maximum brightness. At a start of the fourth period P4, a voltage corresponding to the sum of the maximum voltage level VLM' of the data voltage VDAT and the first high voltage level VLH1 may be stored in the first node N1, causing the pixel PX[k] to emit light at the maximum brightness corresponding to the sum of the maximum voltage level VLM' of the data voltage VDAT and the first high voltage level VLH1.

As shown in FIG. 6, in order to turn on the second transistor T2 to which the data voltage VDAT is applied to the first electrode in the second period P2, the scan signal SPWM[k] having a voltage level higher than the maximum voltage level VLM' of the data voltage VDAT may be applied to the gate electrode of the second transistor T2. Accordingly, the high gate voltage VGH' of the scan signal SPWM[k] may be greater than the maximum voltage level VLM' of the data voltage VDAT, leading to increased power consumption of the pixel PX[k] as the high gate voltage VGH' rises.

Figure 18:
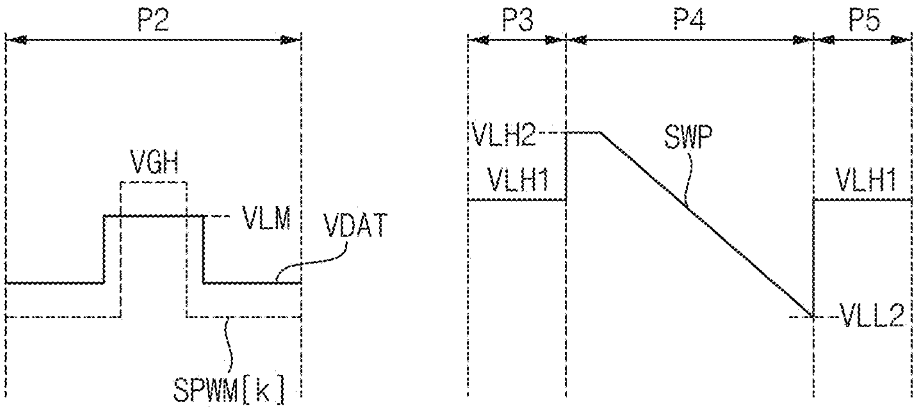
FIG. 18 is a schematic view showing a data voltage, a scan signal, and a sweep signal according to an embodiment.

FIG. 18 is a schematic view showing the data voltage VDAT, the scan signal SPWM[k], and the sweep signal SWP according to an embodiment.

Referring to FIGS. 3 and 18, in an embodiment, the sweep signal SWP may decrease from the second high voltage level VLH2, which is higher than the first high voltage level VLH1, to the second low voltage level VLL2 in the fourth period P4. The data voltage VDAT may reach the maximum voltage level VLM in the second period P2, in the case where the pixel PX[k] emits light at the maximum brightness. At a start of the fourth period P4, a voltage corresponding to the sum of the maximum voltage level VLM of the data voltage VDAT and the second high voltage level VLH2 may be stored at the first node N1, causing the pixel PX[k] to emit light at the maximum brightness corresponding to the sum of the maximum voltage level VLM of the data voltage VDAT and the second high voltage level VLH2. In this case, since the second high voltage level VLH2 is greater than the first high voltage level VLH1, the maximum voltage level VLM of the data voltage VDAT in this embodiment may be lower than the maximum voltage level VLM' of the data voltage VDAT in the comparative example.

As shown in FIG. 6, in order to turn on the second transistor T2 to which the data voltage VDAT is applied to the first electrode in the second period P2, the scan signal SPWM[k] having a voltage level higher than the maximum voltage level VLM of the data voltage VDAT may be applied to the gate electrode of the second transistor T2. Accordingly, the high gate voltage VGH of the scan signal SPWM[k] may be higher than the maximum voltage level VLM of the data voltage VDAT. In this case, since the maximum voltage level VLM of the data voltage VDAT in this embodiment is lower than the maximum voltage level VLM' of the data voltage VDAT in the comparative example, the high gate voltage VGH of the scan signal SPWM[k] in this embodiment may be lower than the high gate voltage VGH' of the scan signal SPWM[k] in the comparative example. Therefore, as the high gate voltage VGH decreases, the power consumption of the pixel PX[k] may be reduced.

Figure 19:
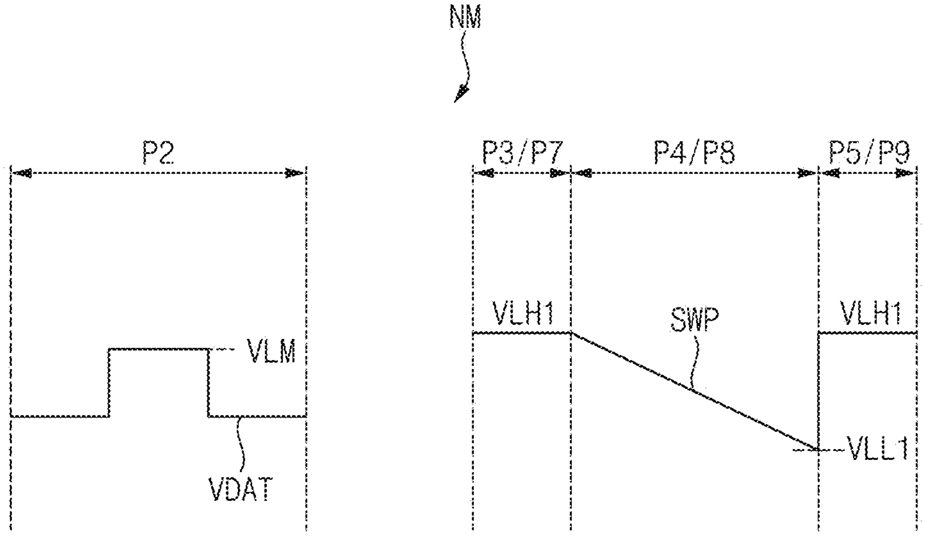
FIG. 19 is a schematic view showing a data voltage and a sweep signal in a normal mode.
Figure 20:
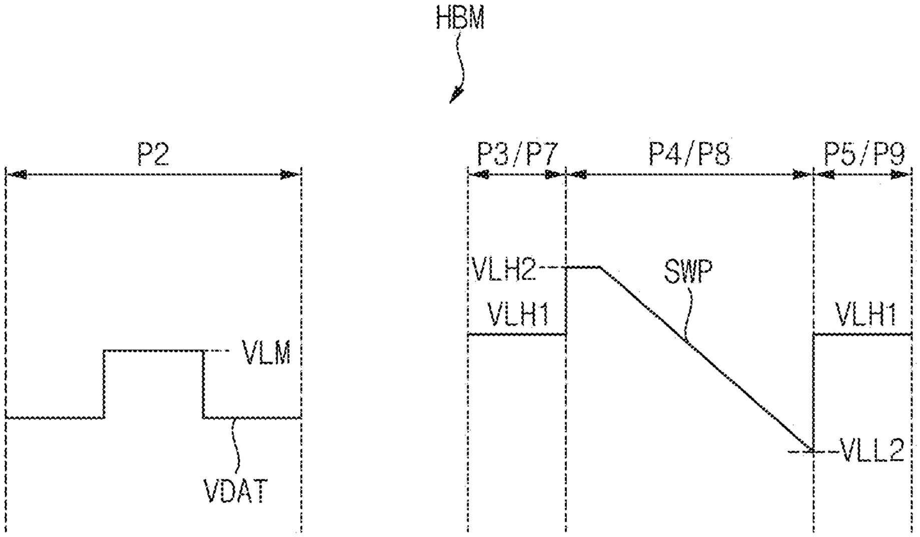
FIG. 20 is a schematic view showing a data voltage and a sweep signal in a high brightness mode.

FIG. 19 is a schematic view showing the data voltage VDAT and the sweep signal SWP in a normal mode NM. FIG. 20 is a schematic view showing the data voltage VDAT and the sweep signal SWP in a high brightness mode HBM.

Referring to FIGS. 1, 3, 19, and 20, the display device 100 may operate in a normal mode NM or a high brightness mode HBM based on the maximum brightness of an image displayed by the display device 100. The maximum brightness of the image in the high brightness mode HBM may be higher than the maximum brightness of the image in the normal mode NM. For example, the maximum brightness of the image may be about 600 nits in the normal mode NM, and the maximum brightness of the image may be about 3000 nits in the high brightness mode HBM.

In an embodiment, the sweep signal SWP may have different shapes in the normal mode NM and the high brightness mode HBM. The sweep signal SWP may decrease from the first high voltage level VLH1 to the first low voltage level VLL1, which is lower than the first high voltage level VLH1, in the emission period P4/P8 of the normal mode NM. The sweep signal SWP may be boosted to the second high voltage level VLH2, higher than the first high voltage level VLH1, before decreasing to the second low voltage level VLL2 in the emission period P4/P8 of the high brightness mode HBM, and may decrease from the second high voltage level VLH2 to the second low voltage level VLL2, which is lower than the second high voltage level VLH2.

In an embodiment, the sweep signal SWP may maintain the second high voltage level VLH2 for a selected time period before decreasing to the second low voltage level VLL2 in the emission period P4/P8 of the high brightness mode HBM.

In an embodiment, the second low voltage level VLL2 may be higher than the first low voltage level VLL1.

At a start of the emission period P4/P8, a voltage corresponding to the sum of the voltage level of the data voltage VDAT and the voltage level of the sweep signal SWP may be stored in the first node N1, causing the pixel PX[k] to emit light having a brightness corresponding to the sum of the voltage level of the data voltage VDAT and the voltage level of the sweep signal SWP. In this case, since the second high voltage level VLH2 of the sweep signal SWP at the start of the emission period P4/P8 of the high brightness mode HBM is higher than the first high voltage level VLH1 of the sweep signal SWP at the start of the emission period P4/P8 of the normal mode NM, the emission time of the light-emitting element LED in the high brightness mode HBM may be greater than the emission time of the light-emitting element LED in the normal mode NM. Accordingly, the brightness of light emitted from the pixel PX[k] in the high brightness mode HBM may be higher than the brightness of light emitted from the pixel PX[k] in the normal mode NM.

In an embodiment, the maximum voltage level VLM of the data voltage VDAT in the high brightness mode HBM may be equal to the maximum voltage level VLM of the data voltage VDAT in the normal mode NM. Since the second high voltage level VLH2 of the sweep signal SWP at the start of the emission period P4/P8 in the high brightness mode HBM is higher than the first high voltage level VLH1 of the sweep signal SWP at the start of the emission period P4/P8 in the normal mode NM, although the maximum voltage level VLM of the data voltage VDAT in the high brightness mode HBM is equal to the maximum voltage level VLM of the data voltage VDAT in the normal mode NM, the emission time of the light-emitting element LED in the high brightness mode HBM may be greater than the emission time of the light-emitting element LED in the normal mode NM. Accordingly, the brightness of the light emitted from the pixel PX[k] in the high brightness mode HBM may be higher than the brightness of the light emitted from the pixel PX[k] in the normal mode NM.

Figure 21:
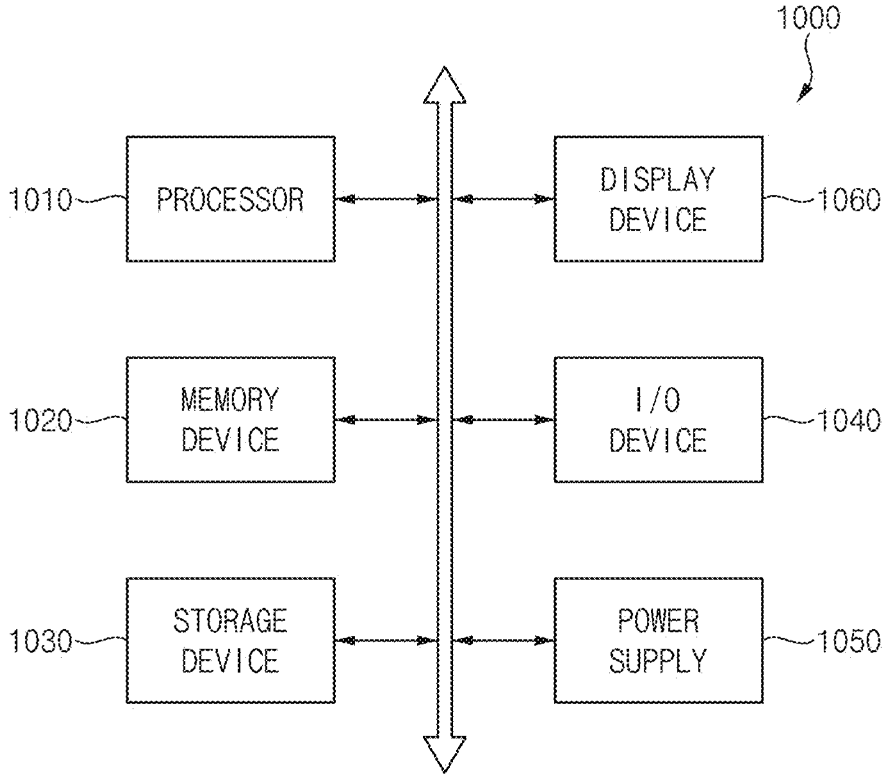
FIG. 21 is a schematic block diagram showing an electronic apparatus according to an embodiment.
Figure 22:
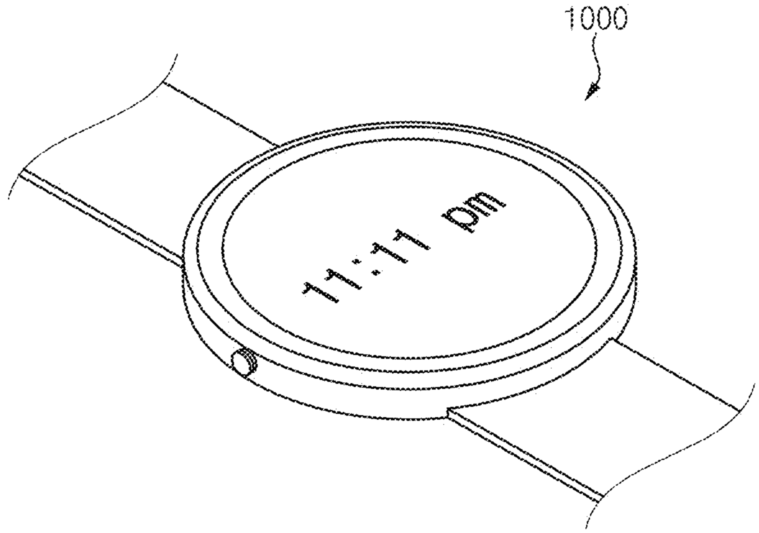
FIG. 22 is a schematic view showing an example in which the electronic apparatus of FIG. 21 is implemented as a smart watch.

FIG. 21 is a schematic block diagram showing an electronic apparatus 1000 according to an embodiment. FIG. 22 is a schematic view showing an example in which the electronic apparatus 1000 of FIG. 21 is implemented as a smart watch.

Referring to FIGS. 21 and 22, an electronic apparatus 1000 may include a processor 1010, a memory device 1020, a storage device 1030, an input/output (I/O) device 1040, a power supply 1050, and a display device 1060. The electronic apparatus 1000 may further include multiple ports for communication with devices such as a video card, a sound card, a memory card, a USB device, or other systems.

In an embodiment, as shown in FIG. 22, the electronic apparatus 1000 may be implemented as a smart watch. However, the disclosure is not limited thereto, and the electronic apparatus 1000 may also be implemented as a television, a mobile phone, a video phone, a smart pad, a tablet PC, a vehicle navigation system, a laptop computer, a head-mounted display, or the like.

The processor 1010 may perform specific calculations or tasks. In an embodiment, the processor 1010 may be a microprocessor, a central processing unit (CPU), or the like.

The processor 1010 may connect to other components through an address bus, a control bus, a data bus, and the like. In an embodiment, the processor 1010 may also connect to an expansion bus such as a peripheral component interconnect (PCI) bus. In an embodiment, the processor 1010 may provide the first image data (IMD1 of FIG. 1) and the control signal (CNT of FIG. 1) to the display device 1060.

The memory device 1020 may store data required for an operation of the electronic apparatus 1000. For example, the memory device 1020 may include: a non-volatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a storage option such as a solid state drive (SSD), a hard disk drive (HDD), a CD-ROM, and the like. The I/O device 1040 may include: an input device such as a keyboard, a keypad, a touch pad, a touch screen, or a mouse; and an output device such as a speaker or a printer. The power supply 1050 may provide a power required for the operation of the electronic apparatus 1000. The display device 1060 may be connected to other components through the buses or other communication links. The display device 1060 may correspond to the display device 100 of FIG. 1. Accordingly, the display device 1060 may include a pixel driven (or operated) by a pulse width modulation such as the pixel PX[k] shown in FIG. 3.

The display device according to embodiments may be applied to a display device included in a computer, a notebook, a mobile phone, a smart phone, a smart pad, a smart watch, a PMP, a PDA, an MP3 player, or the like.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device, comprising:

a display panel including a plurality of pixels;

a scan driver which sequentially provides scan signals to the plurality of pixels; and a data driver which supplies a data voltage and a constant current generation voltage to each of the plurality of pixels, wherein each of the plurality of pixels includes:

a light-emitting element including a first electrode and a second electrode connected to a low power line which transmits a low power voltage;

a pulse width modulator which controls an emission time duration of the light-emitting element based on the data voltage and a sweep signal; and a constant current generator which supplies a driving current having a constant level to the light-emitting element based on the constant current generation voltage, and the sweep signal has a first high voltage level in a non-emission period, and is boosted to a second high voltage level, which is higher than the first high voltage level, before decreasing to a low voltage level lower than the first high voltage level in an emission period, and wherein the pulse width modulator includes:

a first driving transistor including a gate electrode connected to a first node, a first electrode connected to a second node, and a second electrode connected to a third node;

a first write transistor including a gate electrode which receives a scan signal, a first electrode connected to a data line which transmits the data voltage, and a second electrode connected to the second node;

a first compensation transistor including a gate electrode which receives the scan signal, a first electrode connected to the third node, and a second electrode connected to the first node;

a first emission control transistor including a gate electrode which receives an emission control signal, a first electrode which receives a first high power voltage, and a second electrode connected to the second node;

a second emission control transistor including a gate electrode which receives the emission control signal, a first electrode connected to the third node, and a second electrode connected to a fourth node;

a first initialization transistor including a gate electrode which receives a first initialization gate signal, a first electrode which receives a first initialization voltage, and a second electrode connected to the first node; and a first capacitor including a first electrode which receives the sweep signal and a second electrode connected to the first node.

2. A pixel, comprising:

a light-emitting element including a first electrode and a second electrode connected to a low power line which transmits a low power voltage;

a pulse width modulator which controls an emission time duration of the light-emitting element based on a data voltage and a sweep signal; and a constant current generator which supplies a driving current having a constant level to the light-emitting element based on a constant current generation voltage, wherein the sweep signal has a first high voltage level in a non-emission period and is boosted to a second high voltage level, which is higher than the first high voltage level, before decreasing to a low voltage level lower than the first high voltage level in an emission period, and wherein the pulse width modulator includes:

a first driving transistor including a gate electrode connected to a first node, a first electrode connected to a second node, and a second electrode connected to a third node;

a first write transistor including a gate electrode which receives a scan signal, a first electrode connected to a data line which transmits the data voltage, and a second electrode connected to the second node;

a first compensation transistor including a gate electrode which receives the scan signal, a first electrode connected to the third node, and a second electrode connected to the first node;

a first emission control transistor including a gate electrode which receives an emission control signal, a first electrode which receives a first high power voltage, and a second electrode connected to the second node;

a second emission control transistor including a gate electrode which receives the emission control signal, a first electrode connected to the third node, and a second electrode connected to a fourth node;

a first initialization transistor including a gate electrode which receives a first initialization gate signal, a first electrode which receives a first initialization voltage, and a second electrode connected to the first node; and a first capacitor including a first electrode which receives the sweep signal and a second electrode connected to the first node.

3. The pixel of claim 2, wherein the sweep signal maintains the second high voltage level for a selected time period before decreasing to the low voltage level in the emission period.

4. The pixel of claim 2, wherein the sweep signal linearly decreases from the second high voltage level to the low voltage level in the emission period.

5. The pixel of claim 2, wherein the first driving transistor is a P-type transistor, and each of the first write transistor and the first compensation transistor is an N-type transistor.

6. The pixel of claim 1, wherein the constant current generator includes:

a second driving transistor including a gate electrode connected to the fourth node, a first electrode connected to a fifth node, and a second electrode connected to a sixth node;

a second write transistor including a gate electrode which receives a constant current generation scan signal, a first electrode connected to the data line which transmits the constant current generation voltage, and a second electrode connected to the fifth node;

a second compensation transistor including a gate electrode which receives the constant current generation scan signal, a first electrode connected to the sixth node, and a second electrode connected to the fourth node;

a third emission control transistor including a gate electrode which receives the emission control signal, a first electrode which receives a second high power voltage, and a second electrode connected to the fifth node;

a fourth emission control transistor including a gate electrode which receives the emission control signal, a first electrode connected to the sixth node, and a second electrode connected to the first electrode of the light-emitting element;

a second initialization transistor including a gate electrode which receives a second initialization gate signal, a first electrode which receives the first initialization voltage, and a second electrode connected to the fourth node;

a bypass transistor including a gate electrode which receives a bypass gate signal, a first electrode connected to a second initialization voltage line which transmits a second initialization voltage, and a second electrode connected to the first electrode of the light-emitting element; and a second capacitor including a first electrode which receives the second high power voltage and a second electrode connected to the fourth node.

7. The pixel of claim 6, wherein the second driving transistor is a P-type transistor, and each of the second write transistor and the second compensation transistor is an N-type transistor.

8. The pixel of claim 6, wherein the second initialization voltage line is electrically disconnected from the low power line.

9. The pixel of claim 6, wherein a frame includes a display scan period in which the data voltage is written and a self-scan period in which the data voltage is not written, and the second initialization gate signal has a turn-on voltage level in a first initialization period of the display scan period and a second initialization period of the self-scan period.

10. The pixel of claim 9, wherein the first initialization gate signal has a turn-on voltage level in the first initialization period, and has a turn-off voltage level in the second initialization period.

11. A pixel of a display device driven in a normal mode and a high brightness mode, the pixel comprising:

a light-emitting element including a first electrode and a second electrode connected to a low power line which transmits a low power voltage;

a pulse width modulator which controls an emission time duration of the light-emitting element based on a data voltage and a sweep signal; and a constant current generator which provides a driving current having a constant level to the light-emitting element based on a constant current generation voltage, wherein the sweep signal decrease from a first high voltage level to a first low voltage level lower than the first high voltage level in an emission period of the normal mode, and the sweep signal is boosted to a second high voltage level higher than the first high voltage level before decreasing to a second low voltage level in an emission period of the high brightness mode, and wherein the second low voltage level is higher than the first low voltage level.

12. The pixel of claim 11, wherein the sweep signal maintains the second high voltage level for a selected time period before decreasing to the second low voltage level in the emission period of the high brightness mode.

13. The pixel of claim 11, wherein a maximum voltage level of the data voltage in the high brightness mode is equal to a maximum voltage level of the data voltage in the normal mode.

14. The pixel of claim 11, wherein the pulse width modulator includes:

a first driving transistor including a gate electrode connected to a first node, a first electrode connected to a second node, and a second electrode connected to a third node;

a first write transistor including a gate electrode which receives a scan signal, a first electrode connected to a data line which transmits the data voltage, and a second electrode connected to the second node;

a first compensation transistor including a gate electrode which receives the scan signal, a first electrode connected to the third node, and a second electrode connected to the first node;

a first emission control transistor including a gate electrode which receives an emission control signal, a first electrode which receives a first high power voltage, and a second electrode connected to the second node;

a second emission control transistor including a gate electrode which receives the emission control signal, a first electrode connected to the third node, and a second electrode connected to a fourth node;

a first initialization transistor including a gate electrode which receives a first initialization gate signal, a first electrode which receives a first initialization voltage, and a second electrode connected to the first node; and a first capacitor including a first electrode which receives the sweep signal and a second electrode connected to the first node.

15. The pixel of claim 14, wherein the constant current generator includes:

a second driving transistor including a gate electrode connected to the fourth node, a first electrode connected to a fifth node, and a second electrode connected to a sixth node;

a second write transistor including a gate electrode which receives a constant current generation scan signal, a first electrode connected to the data line which transmits the constant current generation voltage, and a second electrode connected to the fifth node;

a second compensation transistor including a gate electrode which receives the constant current generation scan signal, a first electrode connected to the sixth node, and a second electrode connected to the fourth node;

a third emission control transistor including a gate electrode which receives the emission control signal, a first electrode which receives a second high power voltage, and a second electrode connected to the fifth node;

a fourth emission control transistor including a gate electrode which receives the emission control signal, a first electrode connected to the sixth node, and a second electrode connected to the first electrode of the light-emitting element;

a second initialization transistor including a gate electrode which receives a second initialization gate signal, a first electrode which receives the first initialization voltage, and a second electrode connected to the fourth node;

a bypass transistor including a gate electrode which receives a bypass gate signal, a first electrode connected to a second initialization voltage line which transmits a second initialization voltage, and a second electrode connected to the first electrode of the light-emitting element; and a second capacitor including a first electrode which receives the second high power voltage and a second electrode connected to the fourth node.

16. The pixel of claim 15, wherein the second initialization voltage line is electrically disconnected from the low power line.

17. The pixel of claim 15, wherein a frame includes a display scan period in which the data voltage is written and a self-scan period in which the data voltage is not written, and the second initialization gate signal has a turn-on voltage level in a first initialization period of the display scan period and a second initialization period of the self-scan period.

18. The pixel of claim 17, wherein the first initialization gate signal has a turn-on voltage level in the first initialization period, and has a turn-off voltage level in the second initialization period.

* * * * *